(12) United States Patent
Tsurumi et al.

(10) Patent No.: US 8,018,824 B2
(45) Date of Patent: Sep. 13, 2011

(54) OPTICAL DISC RECORDING APPARATUS

(75) Inventors: Teruhiko Tsurumi, Hamamatsu (JP);
Morito Morishima, Fukuroi (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/661,152

(22) Filed: Mar. 11, 2010

(65) Prior Publication Data
US 2010/0195454 A1  Aug. 5, 2010

Related U.S. Application Data

(62) Division of application No. 10/607,339, filed on Jun. 26, 2003, now Pat. No. 7,746,756.

(30) Foreign Application Priority Data

Jun. 28, 2002 (JP) .................................. 2002-190829

(51) Int. Cl.
*G11B 7/00* (2006.01)
(52) U.S. Cl. ..................................... 369/275.4; 369/108
(58) Field of Classification Search .................. None
See application file for complete search history.

(56) References Cited

U.S. PATENT DOCUMENTS

| | | | |
|---|---|---|---|
| 5,398,231 A | 3/1995 | Shin et al. |
| 6,556,234 B1 | 4/2003 | Koyama |
| 7,015,939 B2 | 3/2006 | Honda et al. |
| 2001/0040867 A1 | 11/2001 | Onodera et al. |
| 2002/0191517 A1 | 12/2002 | Honda et al. |
| 2003/0001943 A1 | 1/2003 | Hirotsune et al. |

FOREIGN PATENT DOCUMENTS

| | | |
|---|---|---|
| JP | 09-306144 | 11/1997 |
| JP | A-2001-283470 | 12/2001 |

OTHER PUBLICATIONS

Japanese Patent Office: Notification of Reasons for Refusal, (No. 2002-190829; dated Mar. 13, 2007; 6 pages).
Japanese Patent Office: Notification of Reasons for Refusal, (No. 2007-001268; dated Mar. 13, 2007; 4 pages).

*Primary Examiner* — Van N Chow
(74) *Attorney, Agent, or Firm* — Pillsbury Winthrop Shaw Pittman LLP

(57) ABSTRACT

An optical pickup is disposed which irradiates a laser beam onto an optical disc where a guide groove having characteristics of thermal interference (heat discoloration) is spirally formed. The optical pickup irradiates the laser beam along the guide groove to conduct one of data recording in which pits indicating a data length are formed, and visible-image formation in which a part of the optical disc is discolored. The laser beam irradiation position is controlled so that the data recording is conducted with starting from the inner peripheral side of the optical disc, and the visible-image formation is conducted with starting from the outer peripheral side of the optical disc.

4 Claims, 17 Drawing Sheets

FIG. 7

| | 1ST COLUMN | 2ND COLUMN | 3RD COLUMN | 4TH COLUMN | 5TH COLUMN | 6TH COLUMN | 7TH COLUMN |
|---|---|---|---|---|---|---|---|
| 1ST ROW | (000) | (000) | (000) | (000) | (000) | (000) | (000) |
| 2ND ROW | (101) | (100) | (011) | (100) | (110) | (100) | (111) |
| 3RD ROW | (000) | (000) | (000) | (000) | (000) | (000) | (000) |
| 4TH ROW | (100) | (100) | (011) | (011) | (100) | (011) | (100) |
| 5TH ROW | (000) | (100) | (100) | (000) | (001) | (010) | (000) |

OPTICAL DISC RECORDING APPARATUS

CROSS-REFERENCES TO RELATED APPLICATIONS

This application is a divisional application of U.S. patent application Ser. No. 10/607,339, filed Jun. 26, 2003, now U.S. Pat. No. 7,746,756, which claims priority from Japanese application No. P2002-190829, filed Jun. 28, 2002, the disclosures of which are incorporated herein by reference.

BACKGROUND OF THE INVENTION

The present invention relates to an optical disc recording apparatus which can form a visible image on an optical disc.

Optical disc recording apparatuses which record music data or the like onto an optical disc such as a CD-R (Compact Disc-Recordable) or a CD-RW (Compact Disc-Rewritable) are widely used. An optical disc recording apparatus records data by illuminating an optical disc with a laser beam to form pits corresponding to the data length.

In the case where data recording is to be performed on many optical discs, it is convenient to visually recognize recorded contents of each of the optical discs. Therefore, an optical disc recording apparatus which can record a visible image such as characters in a disc area (unrecorded area) where data is not recorded is beginning to be provided. In such an optical disc recording apparatus, an unrecorded area is illuminated with a laser beam so that the illuminated portion is discolored to form a visible image such as characters and numerals.

In a related optical disc recording apparatus, however, only after all data are recorded, an unrecorded area can be determined and hence formation of a visible image is enabled. In the case where plural sets of data are additionally recorded in several discrete times (for example, the TAO method), such visible-image formation cannot be conducted even when it is requested to form a visible image in the middle of the data recording.

SUMMARY OF THE INVENTION

The invention has been conducted in view of the above-described circumstances. It is an object of the invention to provide an optical disc recording apparatus which can form a visible image at any time irrespective of the progress status of data recording.

In order to solve the aforesaid object, the invention is characterized by having the following arrangement.

(1) An optical disc recording apparatus for forming a visible image on an optical disc comprising:

an optical pickup which applies a laser beam to the optical disc;

a driving section which rotates the optical disc;

a data recording section which controls the optical pickup to apply the laser beam to the optical disc rotated by the driving section with starting from an inner peripheral side of the optical disc for recording data on the optical disc; and a visible image forming section which controls the optical pickup to apply the laser beam to the optical disc rotated by the driving section with starting from the inner peripheral side of the optical disc for forming the visible image on the optical disc, wherein the data recording section virtually partitions the optical disc into a plurality of areas by radials from a center of the optical disc, and forms the visible image sequentially on the plurality of areas.

(2) The optical disc recording apparatus according to (1), wherein the data are recorded on the optical disc during interval between the image being formed on one of the plurality of areas and the image being formed on another of the plurality of areas.

(3) The optical disc recording apparatus according to (1), wherein each of the plurality of areas has a predetermined width from an outer periphery of the optical disc.

(4) The optical disc recording apparatus according to (1), wherein the visible image forming section detects address information stored in the optical disc and uses the detected address information to grasp the plurality of areas on the optical disc.

(5) The optical disc recording apparatus according to (1), wherein the visible image forming section forms the visible image by controlling the optical pickup to apply the laser beam along a guide groove formed at a recording layer of the optical disc to sequentially partially discolor the recording layer with starting from the inner peripheral side of the optical disc.

(6) The optical disc recording apparatus according to (1), wherein the optical pickup is sequentially moved by a feeding section toward an outer periphery of the optical disc.

(7) An optical disc recording apparatus for forming a visible image on a optical disc comprising:

an optical pickup which applies a laser beam to the optical disc;

a driving-section which rotates the optical disc;

a data recording section which controls the optical pickup to apply the laser beam to the optical disc rotated by the driving section with starting from an inner peripheral side of the optical disc for recording data on the optical disc;

a visible image forming section which controls the optical pickup to apply the laser beam to the optical disc rotated by the driving section with starting from the inner peripheral side of the optical disc for forming the visible image on the optical disc; and a position detecting section which, in advance of formation of a new visible image, determines a terminal position where the formation of the visible image is to be ended, the visible image forming section starts the formation of the new visible image at a position which is more inward toward the inner peripheral side of the disc by a predetermined distance than the terminal position which is determined by the position detecting section.

(8) The optical disc recording apparatus according to (7), wherein the position detecting section detects an area where a visible image is already formed, and determines an initial position of said area as a terminal position of a visible image to be newly formed.

(9) The optical disc recording apparatus according to (7), wherein when an area where a visible image is already formed cannot be detected, the position detecting section determines a predetermined outermost peripheral position of said disk as a terminal position of a visible image to be newly formed.

(10) The optical disc recording apparatus according to (7), wherein the visible image forming section starts the formation of the new visible image at a position which is more inward toward said inner peripheral side of the disc than the terminal position by a distance corresponding to a data amount of a visible image to be newly formed.

(11) The optical disc recording apparatus according to (7), wherein the position detecting section obtains information indicative of a position of previous visible-image formation from a predetermined special area in-the optical disc for detecting an area where a visible image is already formed, and each time when a visible image is formed, the visible image forming section records information indicative of a formation position of the visible image, into the special area.

(12) The optical disc recording apparatus according to (7), wherein the position detecting section detects the area where a visible image is already formed, from an envelope shape of a reflected light signal which is obtained by controlling the optical pickup to apply the laser beams to the optical disc.

(13) The optical disc recording apparatus according to (7), wherein the visible image forming section forms the visible image by controlling the optical pickup to apply the laser beam along a guide groove of a recording layer of the optical disc to sequentially partially discolor the recording layer with starting from the inner peripheral side of the optical disc.

(14) The optical disc recording apparatus according to (7), wherein the optical pickup is sequentially moved by a feeding section toward an outer periphery of the optical disc.

BRIEF DESCRIPTION OF THE DRAWINGS

FIG. 7 is a view illustrating contents of image data for forming a visible image.

DETAILED DESCRIPTION OF PREFERRED EMBODIMENTS

Hereinafter, embodiments of the invention will be described with reference to the accompanying drawings.

A: First Embodiment

An optical disc recording apparatus according to the embodiment has an original function of recording data such as music data onto an optical disc, and another function of forming a visible image such as characters.

First, the configuration of an optical disc on which the optical disc recording apparatus of the embodiment conducts data recording and visible-image formation will be described. Thereafter, the configuration of the optical disc recording apparatus of the embodiment will be described.

(Configuration of Optical Disc)

Figure 1:
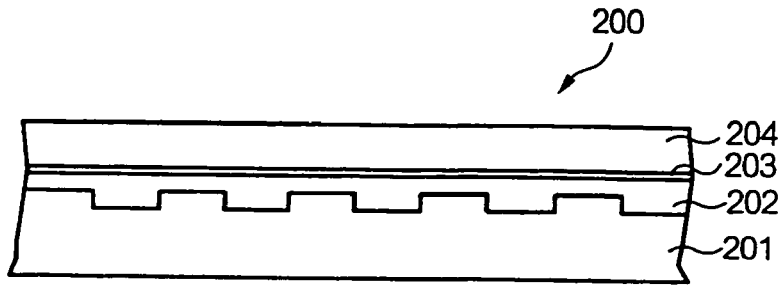
FIG. 1 is a side section view of an optical disc 200 on which recording is to be conducted by an optical disc recording apparatus 100 of a first embodiment of the invention.

FIG. 1 is a side section view of an optical disc 200 on which the optical disc recording apparatus of the embodiment conducts data recording and visible-image formation. In the embodiment, the optical disc is a CD-R disc.

As shown in FIG. 1, the optical disc 200 includes a protective layer 201, a recording layer 202, a reflective layer 203, and a protective layer 204, and has a structure in which these layers are stacked. In FIG. 1, the structure of the optical disc 200 is schematically shown, and the dimension ratios of the layers and the like appearing in the figure are not correct.

Figure 2:
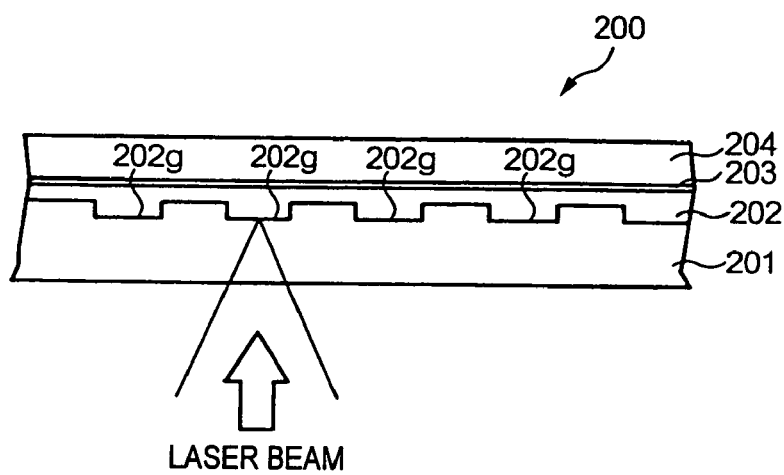
FIG. 2 is a view illustrating the configuration of the optical disc 200.
Figure 3:
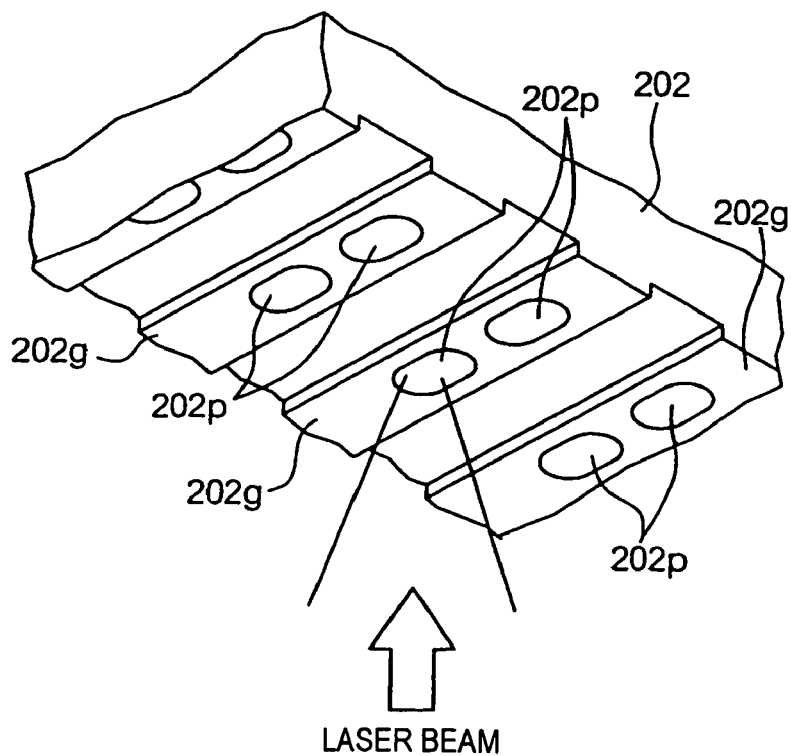
FIG. 3 is a view illustrating the configuration of the optical disc 200.

On the recording layer 202 of the layers, a groove (guiding groove) 202g is spirally formed. When information is to be recorded onto the optical disc 200, a laser beam is irradiated along the groove 202g (groove recording). Specifically, when information is to be recorded onto the optical disc 200, a laser beam is controlled so as to be focused on the groove 202g as schematically shown in FIG. 2, and the laser beam is irradiated along the groove 202g. When a laser beam of a given strength (quantity of heat) is irradiated, a pit 202p corresponding to the length of data to be recorded is formed on the groove 202g, thereby conducting data recording. FIG. 3 schematically shows the manner in which pits 202p are formed as a result of irradiation of the laser beam along the groove 202g.

In the groove 202g, physical address information indicative of a position on the disc is previously recorded in the form of wobble corresponding to an FM-modulated wave. In data recording, the address information is read out, and data recording is conducted on the basis of the address information.

When data which is recorded as described above is to be reproduced, a laser beam is controlled so as to be focused on the groove 202g as schematically shown in FIG. 2, and the laser beam is irradiated along the groove 202g. In reproduction, the laser beam is irradiated at a strength which is lower than that in the case of recording. The recorded data is reproduced by demodulating a signal of light (return light) which is reflected from the optical disc 200 (the reflective later 203) at this time.

The recording layer 202 (the groove 202g) has a nature in which, when a laser beam of a given strength (quantity of heat) is irradiated, the layer is discolored. When a visible image is to be formed on the optical disc 200, therefore, a laser beam is irradiated along the groove 202g in the same manner as the data recording. When a laser beam of a given strength is irradiated, the illuminated portion of the groove 202g is discolored, whereby a visible image is formed.

Figure 4A:
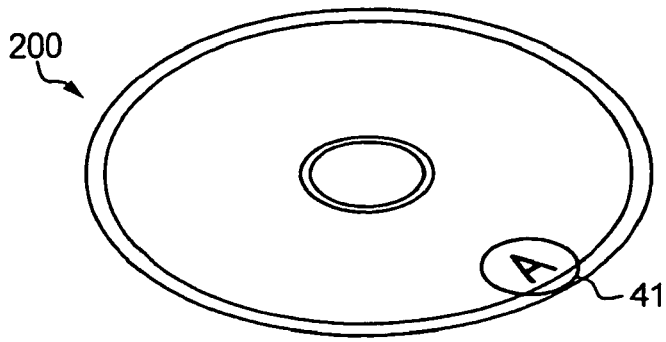
FIGS. 4A to 4C are views illustrating the configuration of the optical disc 200.
Figure 4B:
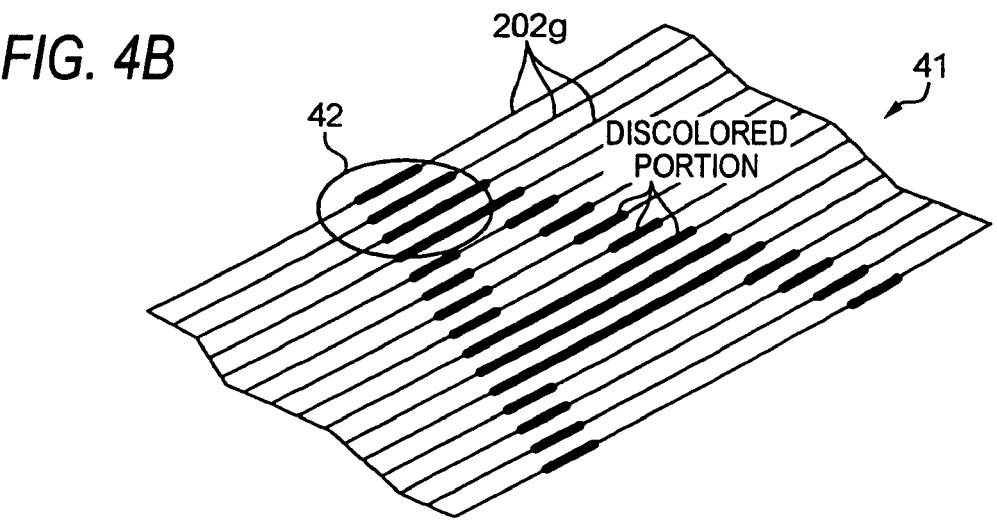
Figure 4C:
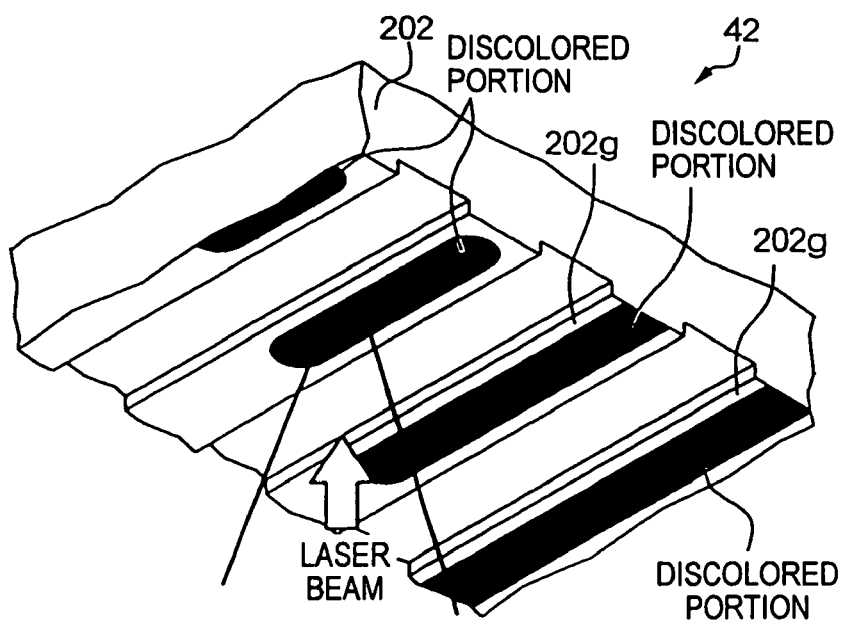

FIGS. 4A to 4C show a specific example of a visible image which is formed in the optical disc 200 (the recording layer 202). Among the figures, FIG. 4A is an overall view of the optical disc 200. In the example, as shown in the figure, alphabetical character "A" is formed as a visible image in an area 41 on the optical disc 200.

FIG. 4B is an enlarged view of the area 41, and FIG. 4C is a view showing an area 42 of FIG. 4B in a further enlarged manner. In FIG. 4C, in order to clarify comparison with the data recording (FIG. 3), the area is shown in an upside-down manner. As shown in the figures, the groove 202g is partly discolored so that a visible image of "A" is formed as a whole.

In this way, both in the data recording (FIG. 3) and the visible-image formation (FIG. 4C), the laser-beam is irradiated along the groove 202g to form pits or conduct partial discoloration. In the data recording, the laser beam is irradiated so that the pits 202p on the order of μm are formed. By contrast, in the visible-image formation, the laser beam is irradiated so-that an area on the order of mm (in a visually distinguishable level) is discolored.

It is seemed that also portions where the pits 202p are formed are heat-discolored. As described above, each of the pits 202p is visually indistinguishable in size. Therefore, the problem in that a formed visible image is made unrecognizable by the discoloration of the pits 202p does not occur.

In the above, the configuration of the optical disc 200 has been described. As described above, the optical disc 200 is configured in the same manner as a conventional CD-R disc or the like except that the recording layer 202 has a nature of discoloration.

(Configuration of Optical Disc Recording Apparatus)

Figure 5:
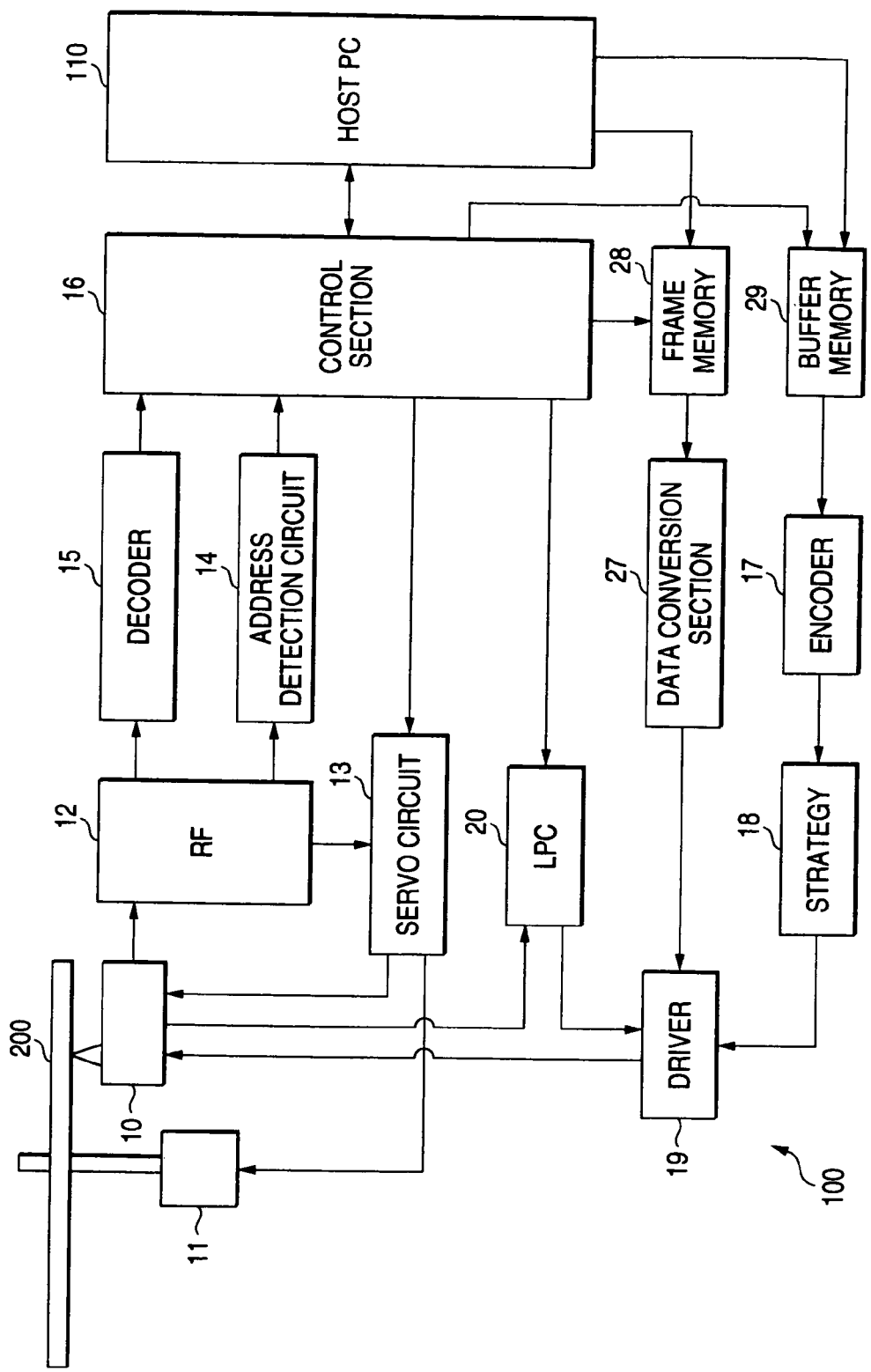
FIG. 5 is a block diagram showing the configuration of the optical disc recording apparatus 100.

FIG. 5 is a block diagram showing main portions of an optical disc recording apparatus 100 of the embodiment of the invention.

As shown in FIG. 5, the optical disc recording apparatus 100 includes an optical pickup 10, a spindle motor 11, an RF amplifier 12, a servo circuit 13, an address detection circuit 14, a decoder 15, a control section 16, an encoder 17, a strategy circuit 18, a laser driver 19, a laser power control circuit 20, a data conversion section 27, a frame memory 28, and a buffer memory 29.

The spindle motor 11 is a motor for rotating the optical disc (in the embodiment, a CD-R disc) 200.

The optical pickup 10 is a unit in which an optical system including a laser diode, a lens, and a mirror, and a light receiving device for return light are integrally disposed.

When data is to be recorded onto the optical disc 200, or when data recorded on the optical disc 200 is to be reproduced, the optical pickup 10 irradiates the optical disc 200 with a laser beam, and receives return light from the optical disc 200. The optical pickup 10 supplies an EFM (Eight to Fourteen Modulation)-modulated RF signal which is a photodetection signal, to the RF amplifier 12.

The optical pickup 10 has a monitor diode. When a current due to return light from the optical disc 200 flows through the monitor diode, a signal corresponding to the amount of the current is supplied to the laser power control circuit 20.

In the data recording or the visible-image formation, the RF amplifier 12 supplies a signal indicative of the level of light reflected from the optical disc 200, to the servo circuit 13, the address detection circuit 14, etc. When recorded data is to be reproduced, the RF amplifier amplifies the EFM-modulated RF signal supplied from the optical pickup 10, and supplies the amplified RF signal to the servo circuit 13, the decoder 15, etc.

In the data reproduction, the decoder 15 EFM-demodulates the EFM-modulated RF signal supplied from the RF amplifier 12, to generate reproduced data.

In the data recording or the visible-image formation, the address detection circuit 14 extracts the wobble signal component from the signal supplied from the RF amplifier 12, decodes the address information (position information of the disc) contained in the wobble signal component, and supplies the decoded information to the control section 16.

The servo circuit 13 conducts a rotation control on the spindle motor 11, focusing and tracking controls in the optical pickup 10, and the like. Based on a control signal supplied from the control section 16, the servo circuit 13 supplies signals for driving the spindle motor 11, etc.

The laser power control circuit 20 is a circuit for controlling the power of the laser beam which is irradiated by the laser diode of the optical pickup 10. On the basis of the value of the current supplied from the monitor diode of the optical pickup 10, and information indicative of an optimum target laser power value and supplied from the control section 16, the laser power control circuit 20 controls the laser driver 19 so that the optical pickup 10 emits a laser beam of a power optimum to the data recording or the visible-image formation.

The buffer memory 29 stores information which is supplied from a host computer 110 in the data recording, i.e., data (record data) which is to be recorded onto the optical disc 200, in the form of a FIFO (First-In First-Out). The encoder 17 EFM-modulates the record data which is read out from the buffer memory 29, and supplies the modulated data to the strategy circuit 18. The strategy circuit 18 conducts a time base correcting process and the like on the EFM signal supplied from the encoder 17, and supplies the processed signal to the laser driver 19. Based on the signal which is supplied from the strategy circuit 18 and modulated in accordance with the record data, and under the control by the laser power control circuit 20, the laser driver 19 drives the laser diode of the optical pickup 10.

The frame memory 28 stores information which is supplied from the host computer 110 in the visible-image formation, i.e., data (image data) of a visible image which is to be formed on the optical disc 200.

Figure 6:
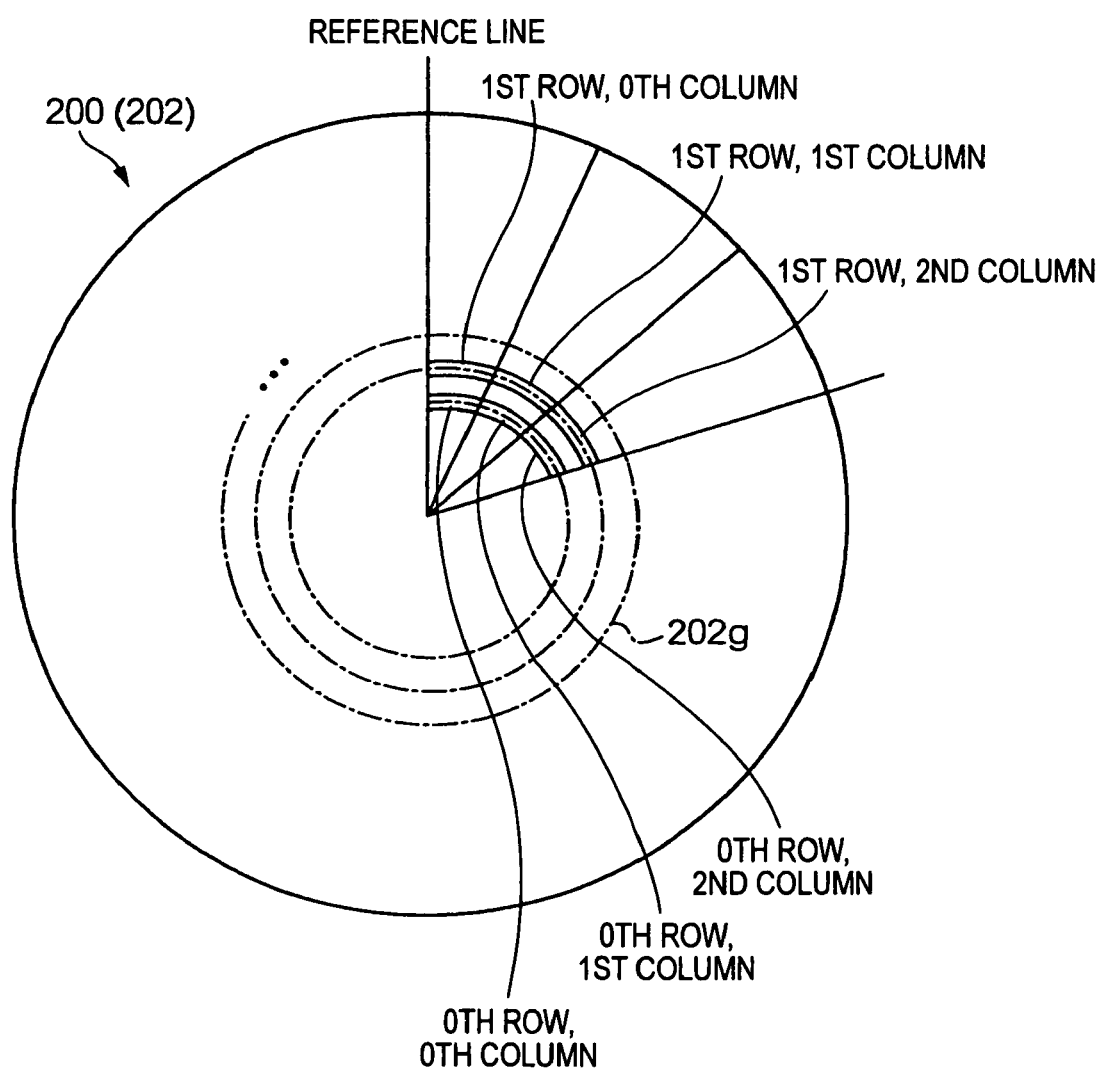
FIG. 6 is a diagram illustrating the basic principle of visible-image formation.

The image data is a set of gray-scale data which define the densities of dots to be formed on the optical disc 200 (the recording layer 202). In the embodiment, on the basis of the shape (spiral shape) of the groove 202g which is formed on the recording layer 202, a coordinate system which is defined by crossings of the groove 202g and radials from the center of the disc. More specifically, as shown in FIG. 6, the starting point of the groove 202g in the inner periphery of the disc is set as a reference point (1st row, 1st column). As advancing with starting from the reference point toward the outer periphery of the disc, a 1-st row, a 2nd row, a 3rd row, . . . are sequentially defined. By contrast, as advancing in a clockwise direction with starting from the reference point (1st row, 1st column), a 1st column, a 2nd column, a 3rd column, . . . are sequentially defined so as to correspond to the other radials, respectively.

Since such a coordinate system is employed, the frame memory 28 stores gray-scale data correlated with rows and columns as shown in FIG. 7. In the embodiment, each scale-data is indicated by 3 bits, and hence an image of 8 (the cube of 2) gray scales is formed for each dot.

Since physical address information is recorded (wobble modulation recorded) in the groove 202g, gray-scale data correlated with the address information may be prepared.

The image data stored in the frame memory 28 are sequentially read out for each dot by the control section 16, and then supplied to the data conversion section 27.

The data conversion section 27 conducts a time base correcting process and the like on-the gray-scale data supplied from the frame memory 28, and supplies the processed data to the laser driver 19. Based on-the signal which is supplied from the data conversion section 27, and under the control by the laser power control circuit 20, the laser driver 19 drives the laser diode of the optical pickup 10.

The control section 16 includes a CPU (Central Processing Unit) 31, and a memory 30 configured by a ROM (Read Only Memory) and a RAM (Random Access Memory). In accordance with predetermined control programs which are previously stored in the memory 30, the control section 16 controls various portions of the optical disc recording apparatus 100 to conduct a control of a focus servo mechanism for recording data, that of a tracking servo mechanism, that of the value of the recording power, the drive control of the spindle motor 11, etc.

The optical disc recording apparatus 100 is configured as described above.

(Data Recording Method)

Next, the operation of the optical disc recording apparatus 100 will be specifically described.

First, the data recording method which is employed in the optical disc recording apparatus 100 of the embodiment will be described. In the embodiment, the track-at-once method (TAO method) is employed. The TAO method is a recording method which is widely used in order to enable additional recording (successive writing) of data.

Figure 8:
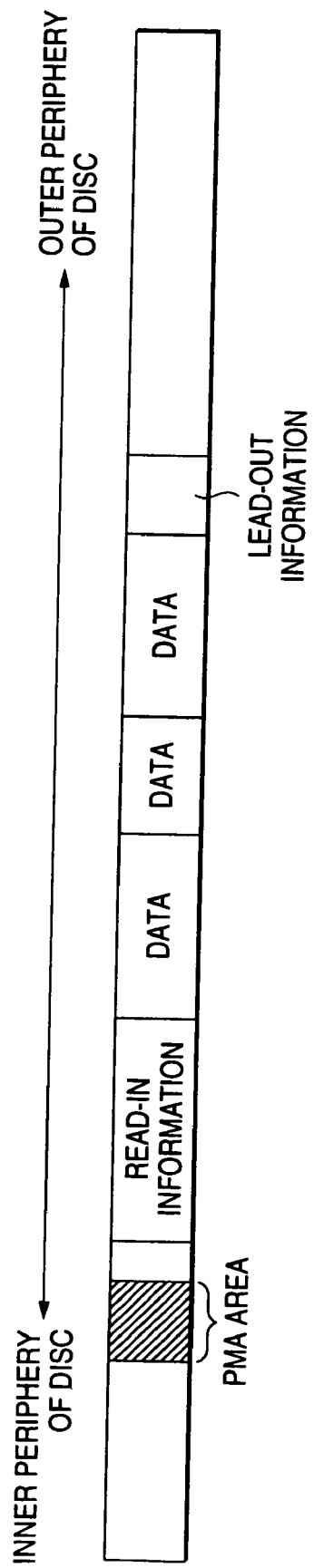
FIG. 8 is a diagram illustrating the TAO method which is one of recording methods.

In the TAO method, as schematically shown in FIG. 8, data recording is conducted several times on the optical disc 200 (additional recording), and lead-in and lead-out information is then recorded. The lead-in information indicates the starting position of a data area, and the lead-out information indicates the end of the data area. A process of recording lead-in and lead-out information is called the close process. In an optical disc on which the close process has been conducted, additional recording of data is prohibited.

In the case where the close process is not conducted, address information indicative of the ending position of data recording is recorded in a program memory area (PMA) of the disc. The PMA area is an area which is previously defined in accordance with the disc standard (Orange Book), and positioned in the inner peripheral side of the disc.

When data is to be then recorded (additionally recorded), the recording is conducted so as to follow the position designated by the address which is recorded in the PMA area. In this way, the TAO method realizes recording in which data are recorded onto the disc without forming a space.

In the above, the outline of the recording method (TAO method) which is used in the embodiment has been described.

(Operation in Data Recording)

Next, the contents of operations in the data recording and the visible-image formation which are conducted on the optical disc 200 with using the optical-disc recording apparatus 100 will be specifically described. First, the operation in the data recording will be described.

Figure 9:
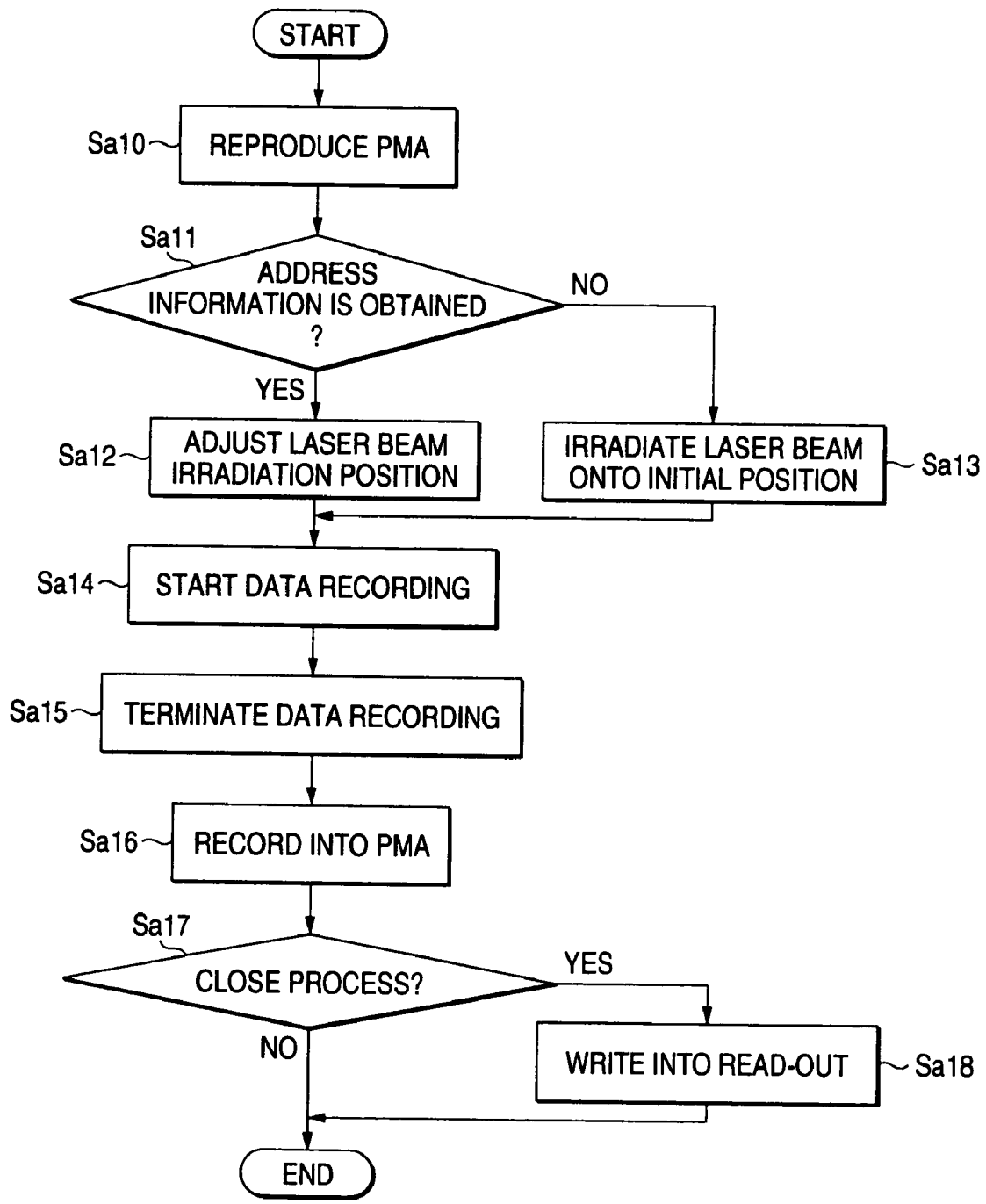
FIG. 9 is a flowchart showing the contents of an operation of a control section 16 in the data recording.

FIG. 9 is a flowchart showing the contents of the control by the control section 16 in the data recording. Hereinafter, the operation will be described with reference to the flowchart.

The user sets the optical disc 200 into the optical disc recording apparatus 100, and instructs the start of the data recording. Then, the control section 16 controls various portions of the apparatus so as to record data onto the optical disc 200. The contents of the operation in the data recording are identical with those in a conventional apparatus. Hereinafter, the contents of the operation will be described.

The control section 16 controls various portions of the optical disc recording apparatus 100 to reproduce the lead-in area of the optical disc 200 which has-been set. When a record signal is not obtained, the PMA area is reproduced (step Sa10). It is then judged whether address information indicative of the ending position of the previous recorded data is recorded in the PMA area or not (step Sa11).

If the judgment result is affirmative, i.e., address information indicative of the ending position of the previous recorded data can be obtained from the PMA area (step Sa11: YES), the control section 16 controls the position of the optical pickup 10 so that the laser beam is applied to the position of the disc indicated by the address information (step Sa12). Thereafter, the data recording is started (step Sa14).

By contrast, if the judgment result is negative, i.e., address information indicative of the ending position of the previous recorded data cannot be obtained from the PMA area (step Sa11: NO), the control section 16 judges that data recording is not yet conducted on the optical disc 200. The control section 16 controls the position of the optical pickup 10 so that the laser beam is applied to the initial position (the head position of the recording area) (step Sa13). Thereafter, the data recording is started (step Sa14).

After the data recording is started, address information indicative of the laser beam irradiation position (recording position) is sequentially supplied from the address detection circuit 14 to the control section 16. On the basis of the obtained address information, the control section 16 reads out the record data stored in the buffer memory 29, and controls various portions of the apparatus to record the data.

When the data recording is then ended (step Sa15), the control section 16 controls various portions of the apparatus to record address information indicative of the ending position of the data recording, into the PMA area (step Sa16).

In this way, each time when data recording is conducted one time, the control section 16 records address information indicative of the ending position of the data recording, into the PMA area. When data is to be additionally recorded, the control section 16 conducts the data recording so as to follow the position indicated by the address information which is recorded in the PMA area. Therefore, data can be recorded onto the disc without forming a space.

Next, the control section 16 judges whether the process of completely ending the data recording (the close process) is instructed by the user or not (step Sa17).

If the judgment result is affirmative (step Sa17: YES), the control section 16 controls various portions of the apparatus to record the lead-out information (step Sa18). The lead-out information indicates the end of record data (see FIG. 8 described above). After the lead-out information is recorded, additional recording on the disc is totally prohibited.

If the judgment result is negative (step Sa17: NO), the control section 16 terminates the process without recording the lead-out information.

In the-above, the contents of the control by the control section 16 in the data recording have been described.

(Operation in Visible-Image Formation)

Next, the contents of the operation in-the visible-image formation will be described.

While the data recording is conducted-with advancing from the inner peripheral side of the optical disc 200 toward the outer peripheral side, the visible-image formation is characterized in that it is conducted with advancing from the outer peripheral side of the optical disc 200 toward the inner peripheral side.

Figure 10:
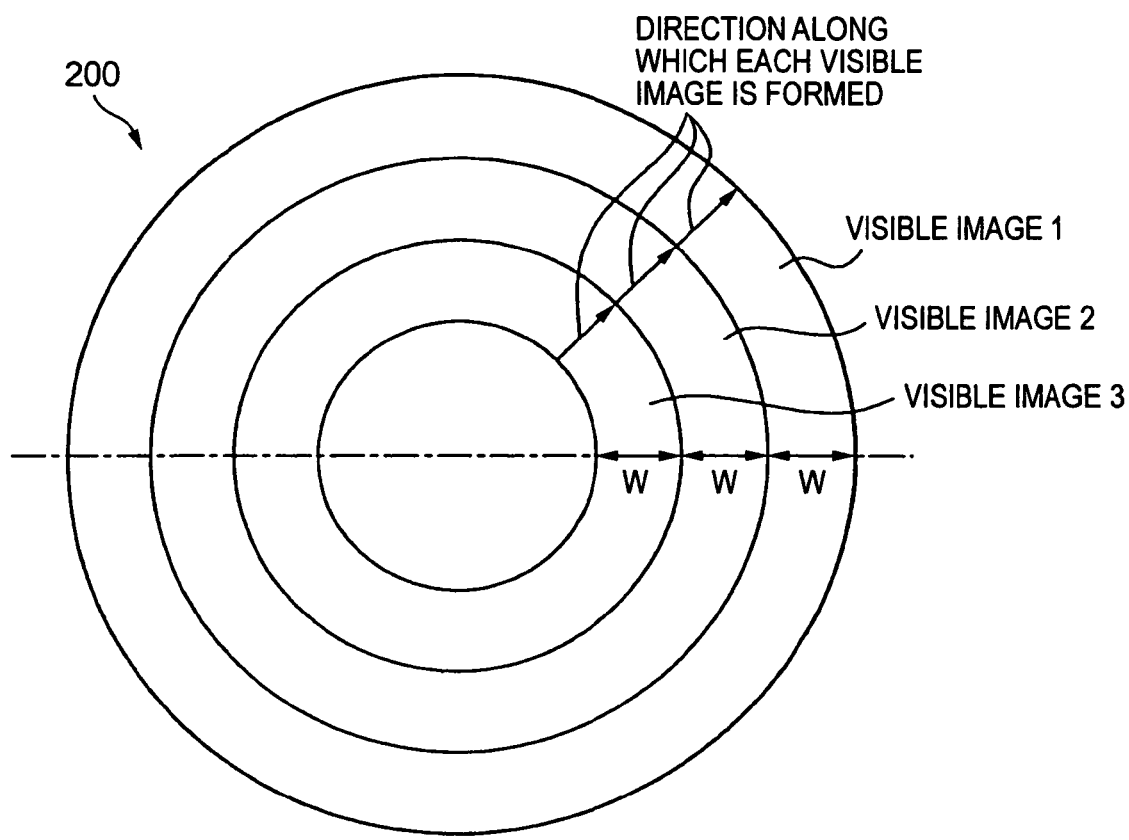
FIG. 10 is a diagram illustrating the basic operation in the visible-image formation.

More specifically, as schematically shown in FIG. 10, a visible image 1, a visible image 2, and a visible image 3 are formed in this sequence with advancing from the outer periphery of the disc toward the inner periphery. The formation of each of the visible images (such as the visible image 1 and the visible image 2) is conducted in the direction oriented from the inner periphery of the disc to the outer periphery (the direction of the arrows shown in FIG. 10).

The visible images are formed in the direction oriented from the outer periphery of the disc to the inner periphery (in the sequence of the visible image 1, the visible image 2, and the visible image 3) because, when the direction of the visible-image formation is opposed to that of the data recording, a visible image can be formed irrespective of the progress status of the data recording. Specifically, even in a stage where the close process is not yet conducted and an unrecorded area of the disc is not yet determined, the visible-image formation does not cause any problem as far as the formation is conducted in the outer peripheral side. In view of this, the visible-image formation is conducted with starting from the outer peripheral side of the disc.

The formation of each of the visible images (such as the visible image 1 and the visible image 2) is conducted in the direction oriented from the inner periphery of the disc to the outer periphery, because of the following reason. The case where the visible-image formation is conducted in the direction oriented from the outer periphery of the disc to the inner periphery will be considered. In this case, in order to apply the laser beam along the groove 202g, the rotation control of the optical disc 200 must be conducted in the direction opposite to that in the data recording, and hence a special control circuit is required. Furthermore, there arises a disadvantage that the address information (position information) recorded in the groove 202g cannot be detected. Therefore, the formation of each of the visible images is conducted in the direction oriented from the inner periphery of the disc to the outer periphery in the same manner as the data recording, so that the existing control circuit can be used as it is and the address information can be detected also in the visible-image formation.

Next, the operation will be described in more detail.

Figure 11:
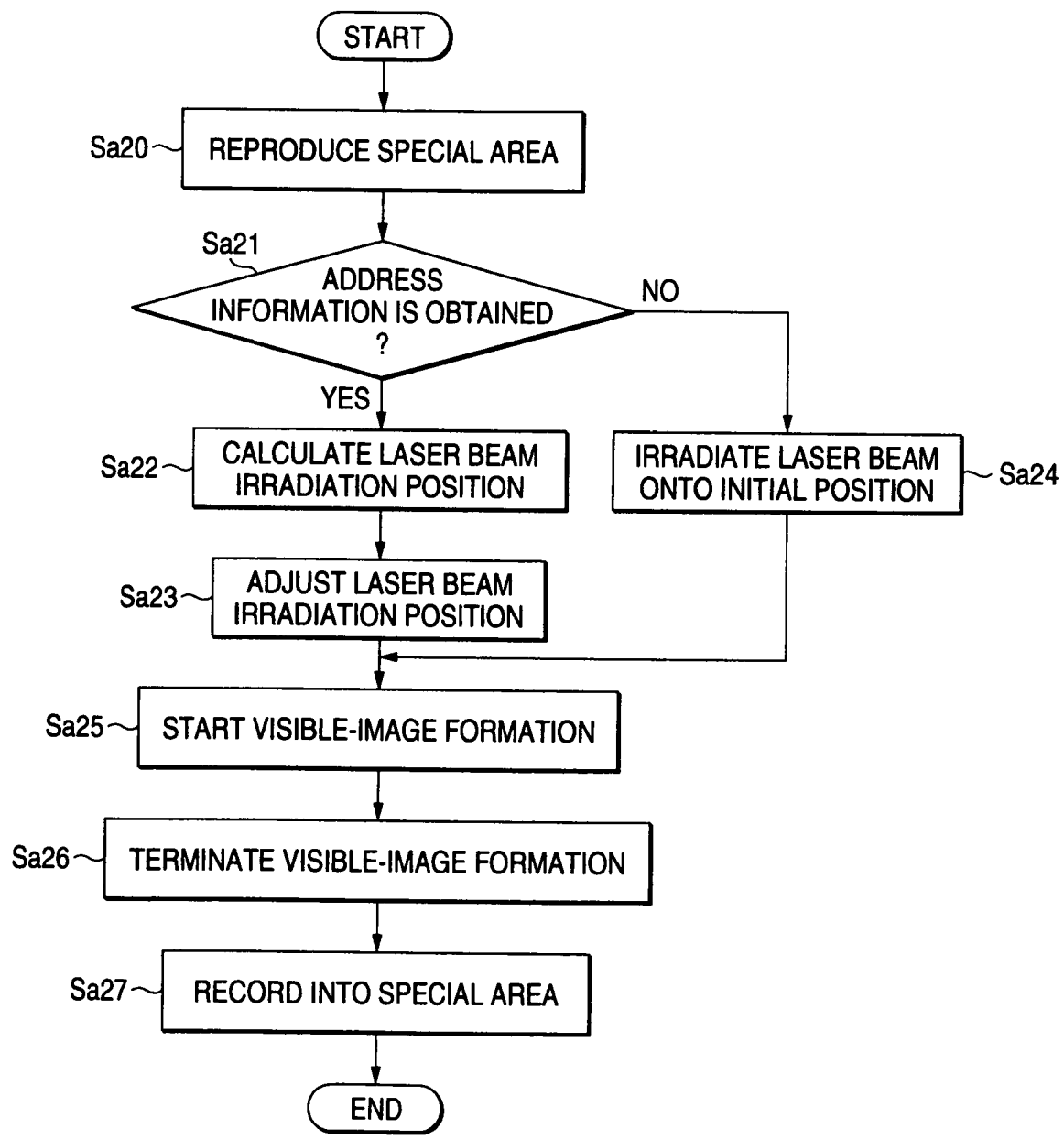
FIG. 11 is a flowchart showing the contents of an operation of the control section 16 in the visible-image formation.

FIG. 11 is a flowchart showing the contents of the control by the control section 16 in the visible-image formation. The user sets the optical disc 200 into the optical disc recording apparatus 100, and instructs the start of the visible-image formation. Then, the control section 16 controls various portions of the apparatus so as to form a visible image on the optical disc 200 in the following manner.

In the following description, in order to distinguish the operation from that in the data recording, the starting position of the formation of a certain visible image is called "start position," and the ending position is called "end position."

The control section 16 controls various portions of the optical disc recording apparatus 100 so as to reproduce the predetermined special area in the optical disc 200 (step Sa20). It is then judged whether address information indicative of the start position of the previously formed visible image is recorded in the special area or not (step Sa21). The special area is an area which is previously determined in the optical disc 200. In the embodiment, the outermost peripheral area (for example, an area of a predetermined number of tracks) of the optical disc 200 is allocated to the special area. The special area corresponds to the PMA area in the data recording, and address information which is necessary for forming visible images on the disc without forming a space is recorded in the special area.

If the judgment result is affirmative, or if address information indicative of the start position of the previously formed visible image can be obtained from the special area (step Sa21: YES), the control section 16 determines the start position of the current visible-image formation from the address information. The control section 16 controls the position of the optical pickup 10 so that the laser beam is applied to the determined position (step Sa23), and the visible image is then actually formed (step Sa24).

The start position of the current visible-image formation which is determined by the control section 16 will be described in detail.

As described above (FIG. 10), in the embodiment, the visible-image formation in the case where plural visible images are to be formed is sequentially conducted with starting from the outer peripheral side of the disc. Specifically, the start position of the previously formed visible image coincides with the end position of the visible image which is to be currently formed, so that the visible-image formation is conducted without forming a space on the disc. In the example shown in FIG. 10, the start position of the visible image 1 is identical with (adjacent to) the end position of the visible image 2, and the start position of the visible image 2 is identical with (adjacent to) the end position of the visible image 3.

In order to realize the visible-image formation which does not form a space, the special area of the optical disc 200 stores address information indicative of the start position of the previously formed visible image. The control section 16 determines the start position of the current visible-image formation from address information which is obtained by reproducing the special area, in the following manner.

In the embodiment, the disc width W (the radial width in the disc) which is used in one visible-image formation has a predetermined value (for example, 5 mm) (see FIG. 10). As the start position of the current visible-image formation, therefore, the control section 16 determines a position which is moved by a distance corresponding to the width W toward the inner peripheral side of the disc from the start position of the previous visible-image formation that is indicated by the address information obtained from the special area. Alternatively, the value of the width W may be varied in accordance with the contents (data amount) of the visible image to be formed.

The control section 16 controls the position of the optical pickup 10 so that the laser beam is irradiated onto the thus determined start position (step Sa23), and then starts the visible-image formation (step Sa25).

Next, the contents of the control by the control section 16 in the case where address information indicative of the ending position of the previous data recording is not obtained as a result of reproduction of the PMA area (step Sa21: NO) will be described. In this case, the control section 16 judges that visible-image formation is not yet conducted on the optical disc 200, and controls the position of the optical pickup 10 so that the laser beam is irradiated onto a predetermined start position (step Sa24), and then starts the visible-image formation (step Sa25).

The predetermined start position is a position which is moved by a distance corresponding to the width W toward the inner peripheral side of the disc from the outermost peripheral position where the visible-image formation is enabled (the outermost peripheral position where the groove 202g is formed). Position information related to the start position is stored in the memory of the control section 16.

When the visible-image formation is started, in the same manner as the data recording, address information indicative of the laser beam irradiation position (image forming position) is sequentially supplied from the address-detection circuit 14 to the control section 16. At timings based on the obtained address information, the control section 16 sequentially reads out the gray-scale data-stored in the frame memory 28, and controls various portions of the apparatus to form a visible image.

When the visible-image formation is then ended (step Sa26), the control section 16 records address information indicative of the start position where the visible-image formation is started, into the special area (step Sa27).

In this way, each time when one visible-image formation is conducted, the control section 16 records address information indicative of the start position of the visible-image formation into the special area. New visible-image formation is then conducted with starting from a position which is moved by a distance corresponding to the width W toward the inner peripheral side of the disc from the position indicated by the address information recorded in the special area, whereby visible images are formed on the optical disc 200 without forming a space.

In the above, for the sake of convenience, the contents of the operations in the data recording and the visible-image formation have been separately described. However, the operations may be continuously conducted.

When the user instructs the start of the operation while designating both the data recording and the visible-image formation, for example, the control section 16 may conduct the control (the flow shown in FIG. 9) related to the data recording, and in succession that (the flow shown in FIG. 11) related to the visible-image formation. In other words, the contents of the operation in the data recording are independent from those in the visible-image formation, and hence the operations may be conducted separately or continuously.

Furthermore, the data recording may be conducted after the visible-image formation. Namely, the data recording and the visible-image formation may be conducted in an arbitrary sequence. In any event, in the optical disc 200 of the embodiment, the data recording and the visible-image formation can be implemented in an arbitrary sequence.

Figure 12:
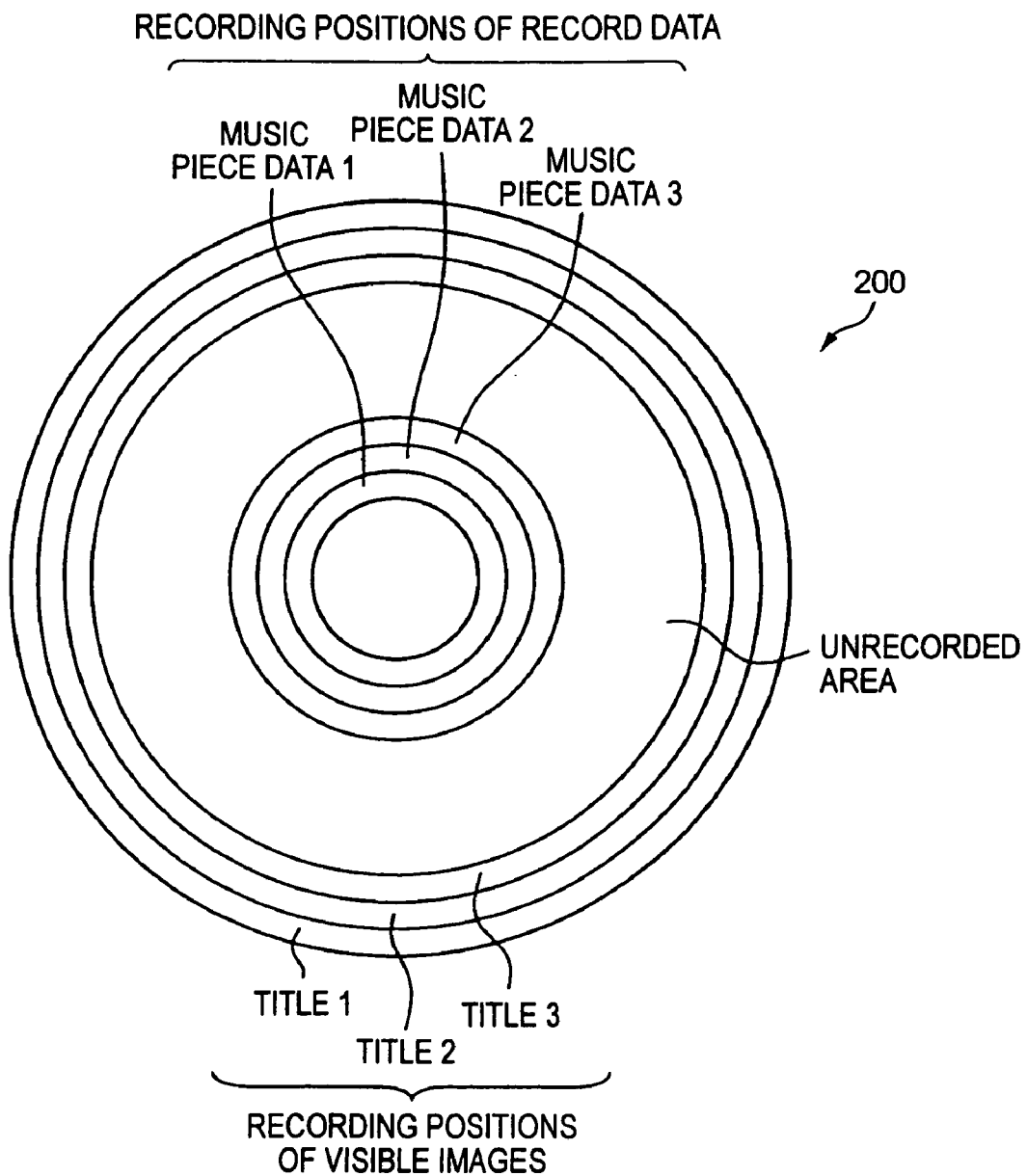
FIG. 12 is a diagram illustrating an effect of the operation of the optical disc recording apparatus 100.

FIG. 12 is a diagram showing an example in which data recording of three sets of music piece data (MUSIC PIECE DATA 1, MUSIC PIECE DATA 2, and MUSIC PIECE DATA 3), and visible-image formation of titles of the music pieces (TITLE 1, TITLE 2, and TITLE 3) are conducted on the optical disc 200 with using the optical disc recording apparatus 100.

When the optical disc recording apparatus 100 of the invention is used, the data recording and the visible-image formation can be conducted in an arbitrary sequence. After, for example, MUSIC PIECE DATA 1 is recorded, therefore, TITLE 1 of MUSIC PIECE DATA 1 can be formed as a visible image. This is largely different from the operation in a related apparatus in which a visible image can be recorded only after all of MUSIC-PIECE DATA 1 to 3 are recorded and the close process is conducted on the data recording.

Thereafter, a process in which MUSIC PIECE DATA 2 is additionally recorded behind MUSIC PIECE DATA 1 and TITLE 2 of MUSIC PIECE DATA 2 is formed as a visible image may be conducted.

Since such processes can be conducted at any sequence, all of MUSIC PIECE DATA 1 to 3 may be first recorded and visible images of TITLEs 1 to 3 may be then formed in bundle. Conversely, visible images of TITLEs 1 to 3 may be first formed in bundle, and MUSIC PIECE DATA 1 to 3 may be then recorded.

As described above, the optical disc recording-apparatus 100 according to the embodiment can perform on the optical disc 200, the original function of recording data, and another function of forming a visible image. The data recording is conducted with starting from the inner peripheral side of the disc, and the visible-image formation is conducted with starting from the outer peripheral side of the disc, so that no space is formed on the disc. Therefore, the data recording and the visible-image formation can be conducted while using the limited recording area (the groove 202g on the recording layer 202) of the disc to the maximum extent.

Since the visible-image formation is conducted with starting from the outer peripheral side of the disc, a visible image can be formed even in a stage where the close process is not yet conducted on the data recording or an unrecorded area is not yet determined.

When the optical disc recording apparatus 100 is used, the data recording and the visible-image formation can be efficiently conducted in an arbitrary sequence, and convenience can be enhanced in accordance with the ease of use for each user.

Modifications of First Embodiment

The embodiment described above is a mere example of application of the invention, and can be arbitrarily modified. Hereinafter, some modifications will be described.

(1) In the embodiment, the radial width W of the disc in which the visible-image formation is conducted has a given value. Alternatively, the width W may be arbitrarily set by the user. In the alternative also, the control section 16 can perform the control in the same manner as the embodiment described above. Namely, the control section 16 controls the position of the optical pickup 10 so that the laser beam is applied to a position which is moved by the designated width toward the inner peripheral side of the disc from the start position of the previous visible-image formation. Then, the control section controls various portions of the apparatus so as to start the visible-image formation. As a result, the modification can attain the same effects as those of the embodiment.

(2) In the embodiment, the special area is formed on the optical disc 200 to record at any time address information indicative of the start point of the Previously formed visible image. Alternatively, instead of the additional formation of a special area, address information may be recorded in the start position or the end position of a formed visible image.

A disc area which corresponds to one track at most is required for recording address information, and so such an area is not visually distinguishable. Even when a special area is not additionally formed and address information is recorded adjacent to a formed visual image, therefore, there arises no visual problem.

(3) In the embodiment, a visible image is formed by irradiating the laser beam along the groove 202g to discolor a part of the groove 202g. When such a control is employed, the visible-image formation can be conducted depending on the resolution of the interval (track width) at which the groove 202g is formed.

In the case where a high resolution which is as high as the track width (on the order of μm) is not required, the image formation may be conducted by applying the laser beam without moving along the groove 202g. For example, the focusing control may be conducted so that the laser beam applied to the optical disc 200 (the recording layer 202) has a larger spot, diameter, and parts of the groove 202g which are adjacently formed may be discolored in bundle to form a visible image. Alternatively, the visible-image formation may be conducted by wobbling the laser beam in a range extending over parts of the groove 202g which are adjacently formed.

In the modification also, the control which is performed before the start position of the visible-image formation is determined is identical with that in the embodiment. Namely, the control section 16 reproduces the special area of the optical disc 200 to obtain address information indicative of the start position of the previous visible-image formation, and, from the address information, determines the start position of the current visible-image formation.

When the special area is to be reproduced, the laser beam must be focused on the groove 202g (of the special area), and hence the control section 16 controls various portions of the apparatus so that the laser beam is irradiated along the groove 202g. When the visible-image formation is to be actually conducted, it is not necessary to irradiate the laser beam along the groove 202g, and hence the control section 16 controls various portions of the apparatus so that the spot diameter of the laser beam on the optical disc 200 is enlarged, or that the laser beam spot is wobbled. The visible-image formation is conducted by discoloring plural tracks of the groove 202g in bundle.

In the modification also, in the same manner as the embodiment, visible images are sequentially formed with starting from the outer peripheral side of the disc so that no space is formed on the disc. Therefore, the data recording and the visible-image formation can be conducted while using the limited recording area (the groove 202g on the recording layer 202) of the disc to the maximum extent. Similarly, a visible image can be formed irrespective of the progress status of the data recording (even in a stage such as that where the close process is not yet conducted).

B: Second Embodiment

In the embodiment described above, in order to conduct the visible-image formation on the optical disc 200 with forming a space, address information indicative of the start position of the previously formed visible image is recorded in a predetermined area (special area) of the optical disc 200.

From the viewpoint of visibility, however, it may not be always necessary to conduct the image formation on the order of μm by means of address management. Based on this point of view, an optical disc recording apparatus 101 according to the second embodiment is characterized in that address management is not conducted in the visible-image formation.

Figure 13:
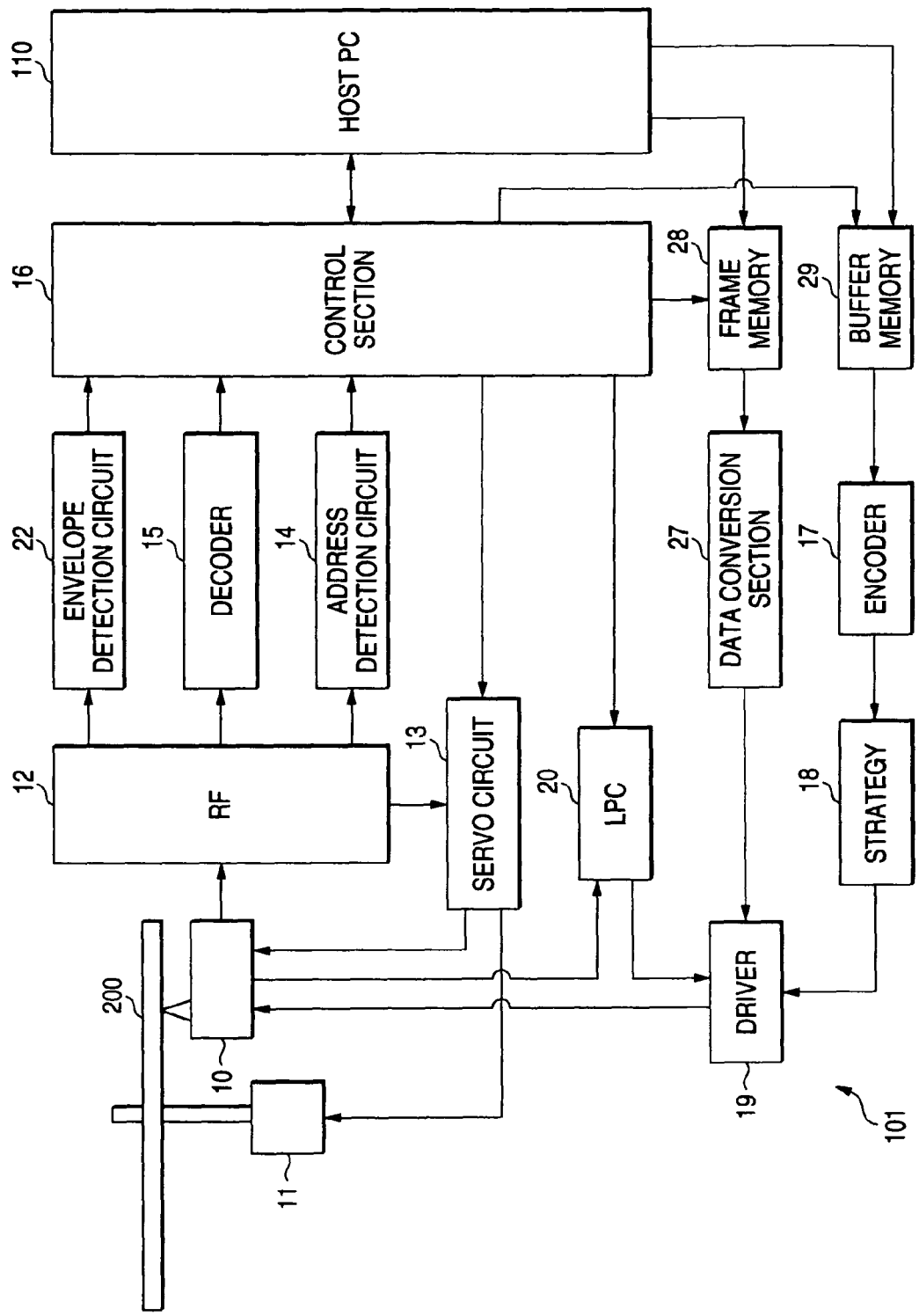
FIG. 13 is a block diagram showing the configuration of an optical disc recording apparatus 101 of a second embodiment of the invention.

FIG. 13 is a block diagram showing the configuration of the optical disc recording apparatus 101 of the embodiment. As shown in FIG. 13, the optical disc recording apparatus 101 is different from the optical disc recording apparatus 100 of the embodiment described above, only in that an envelope detection circuit 22 is added. Hereinafter, description will be therefore made on different potions, and description of the same components as those of the embodiment described above will be made with using the same reference numerals.

The envelope detection circuit 22 is a circuit which, in the visible-image formation, detects (searches) the start position of the previously formed visible image.

Figure 14:
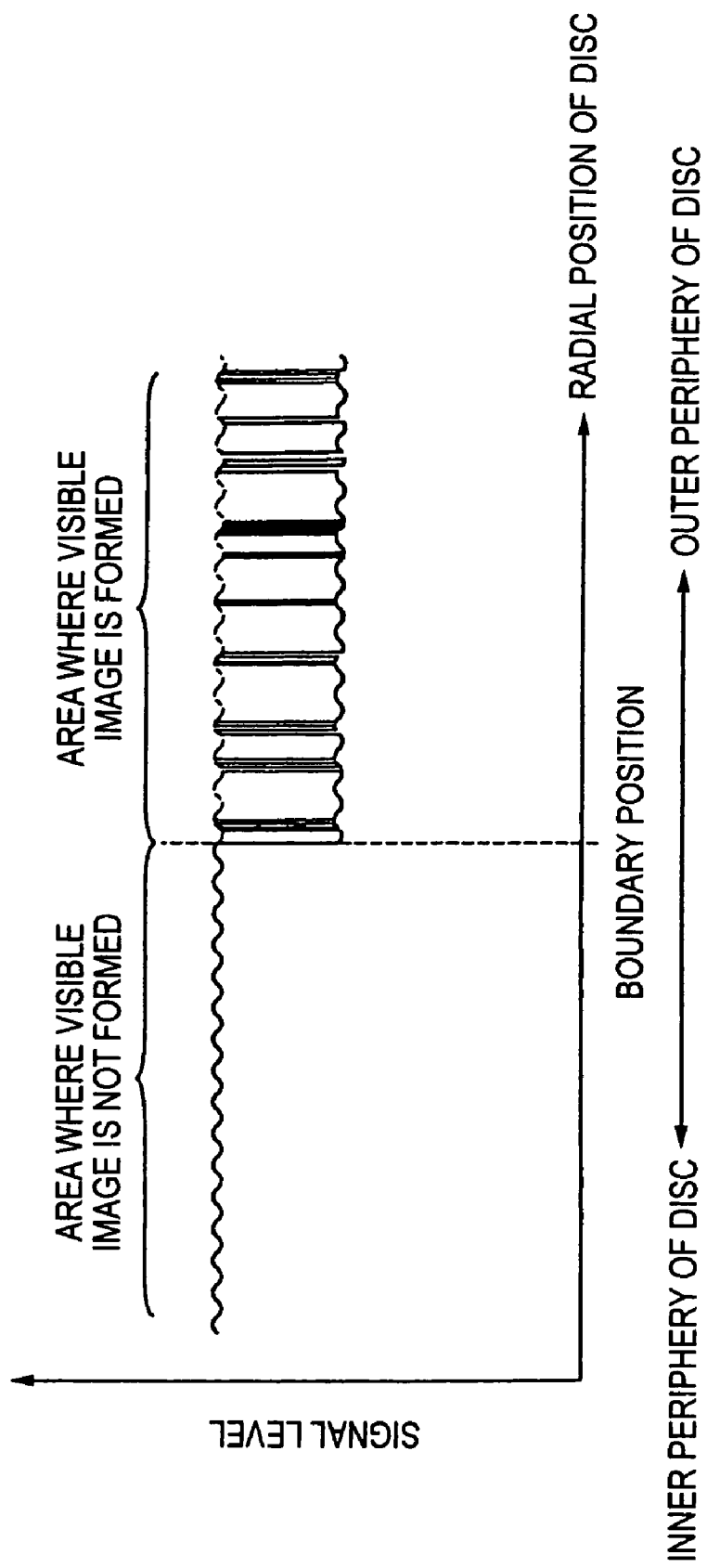
FIG. 14 is a view illustrating an operation of an envelope detection circuit 22.

FIG. 14 is a view schematically showing the contents of signals which are supplied from the RF amplifier 12 to the envelope detection circuit 22 when a laser beam (a low-level laser beam for reproduction) is applied along the groove 202g. As shown in FIG. 14, the signals supplied from the RF amplifier 12 are roughly classified into a signal S1 which has a high level and a small level amplitude (PP value: peak to peak-value), and a signal S2 which has a low level and a large PP value.

Of the signals, the signal S1 corresponds to an area where a visible image is not formed. In an area where a visible image is not formed, the groove 202g is kept to an unrecorded state (initial state), and hence a reflection signal has a high-level (initial state), and a small PP value. By contrast, the signal S2 corresponds to an area where a visible image is formed. In an area where a visible image is formed, the state of the groove 202g is changed (discolored) by irradiation of a laser beam, and the reflectivity is lowered. Therefore, the signal level of reflected light of a laser beam irradiated onto the area is low. The reflected light contains various signal components, and hence the PP value of the signal is large.

The envelope detection circuit 22 detects the state (the level and the PP value) of the signal which is supplied from the RF amplifier 12 as described above, and supplies to the control section 16 information related to a boundary position between an area where a visible image is formed, and that where a visible image is not formed.

Figure 15:
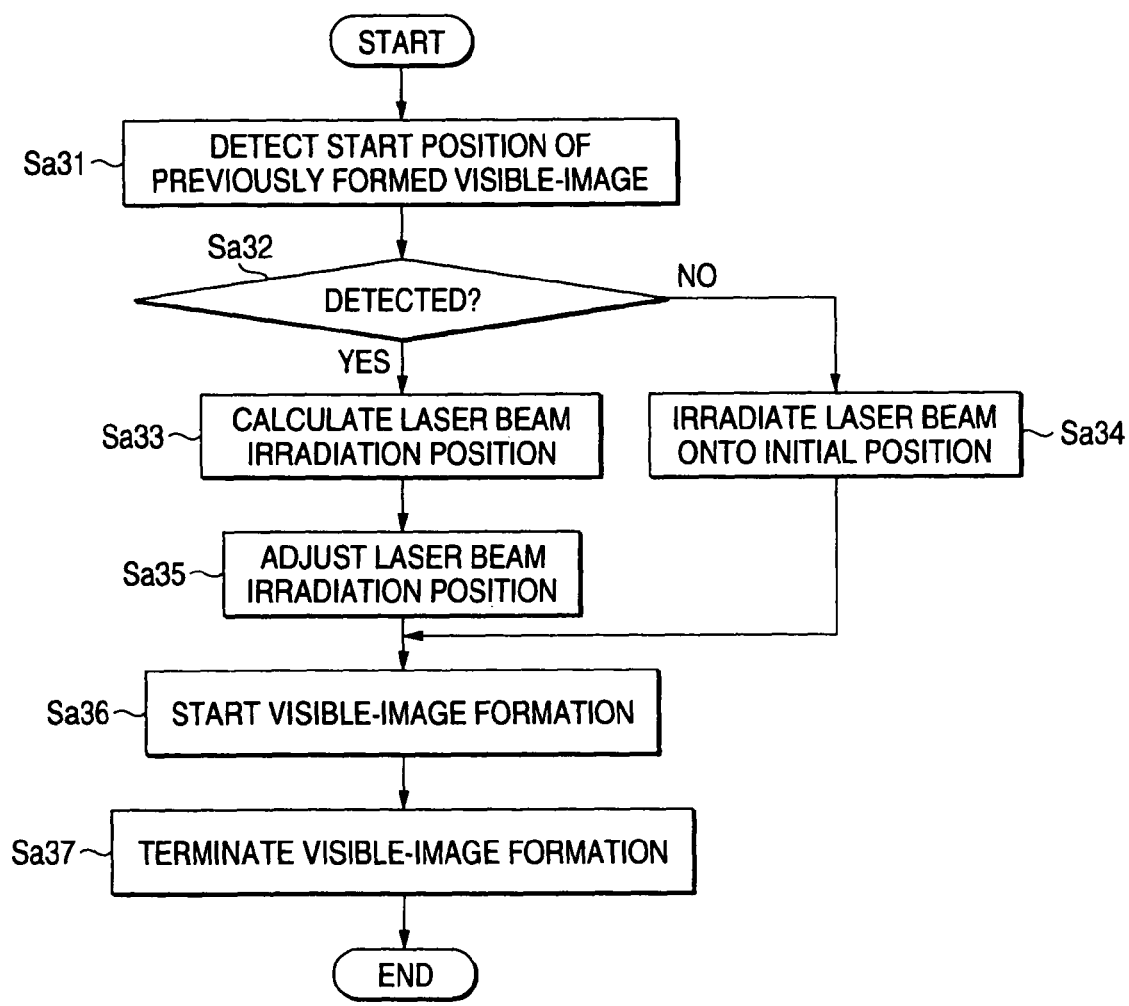
FIG. 15 is a chart illustrating the basic operation of the optical disc recording apparatus 101.

Next, the contents of the operation of the optical disc recording apparatus 101 of the embodiment will be described. The operation in the data recording is identical with that of the optical disc recording apparatus 100 of the embodiment described above, and hence the contents of the operation in the visible-image formation will be described. FIG. 15 is a flowchart showing the contents of the control by the control section 16 in the visible-image formation.

When formation of a visible image is instructed, the control section 16 controls various portions of the apparatus to detect the start position of the previously formed visible image (step Sa31). More specifically, the laser beam is applied along the groove 202g on the optical disc 200 (the recording layer 202). From the state of an envelope of the signal supplied from the envelope detection circuit 22, the control section determines a boundary position between an area where a visible image is formed, and that where a visible image is not formed.

When the high positional accuracy is not considered, the thus determined boundary position is identical with the position indicated by the address information which is obtained from the special area in the embodiment described above.

The contents of the subsequent control by the control section 16 are identical with those of the embodiment described above. Namely, the control section 16 controls various portions of the apparatus so that the laser beam is applied to a position which is moved by a distance corresponding to the width W toward the inner peripheral side of the disc from the detected boundary position (step Sa35), and the visible image is then actually formed (step Sa36).

In the embodiment, address management is not conducted in the visible-image formation, and hence it is not required to perform a control of recording address information into the special area.

As described above, also in the optical disc recording apparatus 101 of the embodiment, the original function of recording data, and another function of forming a visible image can be performed on the optical disc 200 in the same manner as the embodiment described above. Similarly, the data recording is conducted with starting from the inner peripheral side of the disc, and the visible-image formation is conducted with starting from the outer peripheral side of the disc, so that no space is formed. Therefore, the data recording and the visible-image formation can be conducted while using the limited recording area of the disc to the maximum extent. Since the visible-image formation is conducted with starting from the outer peripheral side of the disc, a visible image can be formed even in a stage where the close process is not yet conducted on the data recording (an unrecorded area is not yet determined). When the optical disc recording apparatus 101 is used, therefore, the data recording and the visible-image formation can be efficiently conducted in an arbitrary sequence, and convenience can be enhanced in accordance with the ease of use for each user.

C: Third Embodiment

In the embodiments described above, the visible-image formation is sequentially conducted with advancing from the outer peripheral side of the optical disc 200 toward the inner peripheral side. By contrast, the optical disc recording apparatus of the embodiment is characterized in that the optical disc 200 is partitioned by radials from the center of the disc into a plurality of areas and the visible-image formation is conducted sequentially on the areas.

Figure 16:
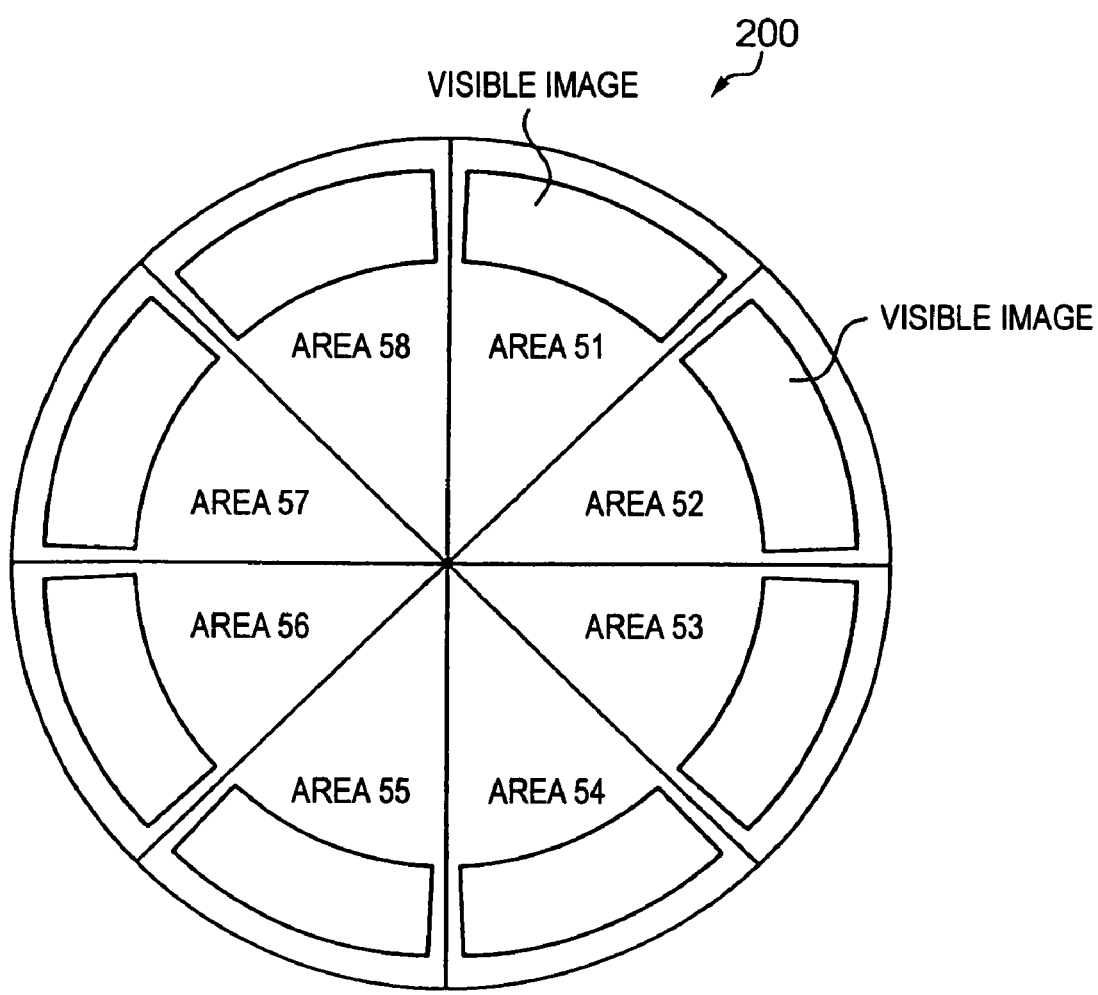
FIG. 16 is a diagram illustrating the basic operation of an optical disc recording apparatus of a third embodiment of the invention.

More specifically, as shown in FIG. 16, the face of the optical disc 200 (the recording layer 202) is partitioned by radials from the center of the optical disc 200 into a plurality of areas. FIG. 16 shows an example in which the face is equally partitioned into eight areas of an area 51, an area 52, ..., and an area 58 (hereinafter, such an area is referred to as a partition area). Each area has a predetermined width from the outer periphery of the optical disc 200.

The optical disc recording apparatus of the embodiment sequentially conducts the visible-image formation on the thus defined partition areas. In the example of FIG. 16, a visible image 1 is formed in the area 51, and a visible image 2 is formed in the area 52. Subsequently, the visible-image formation is sequentially conducted in the area 53, the area 54, ... in this order.

Figure 17:
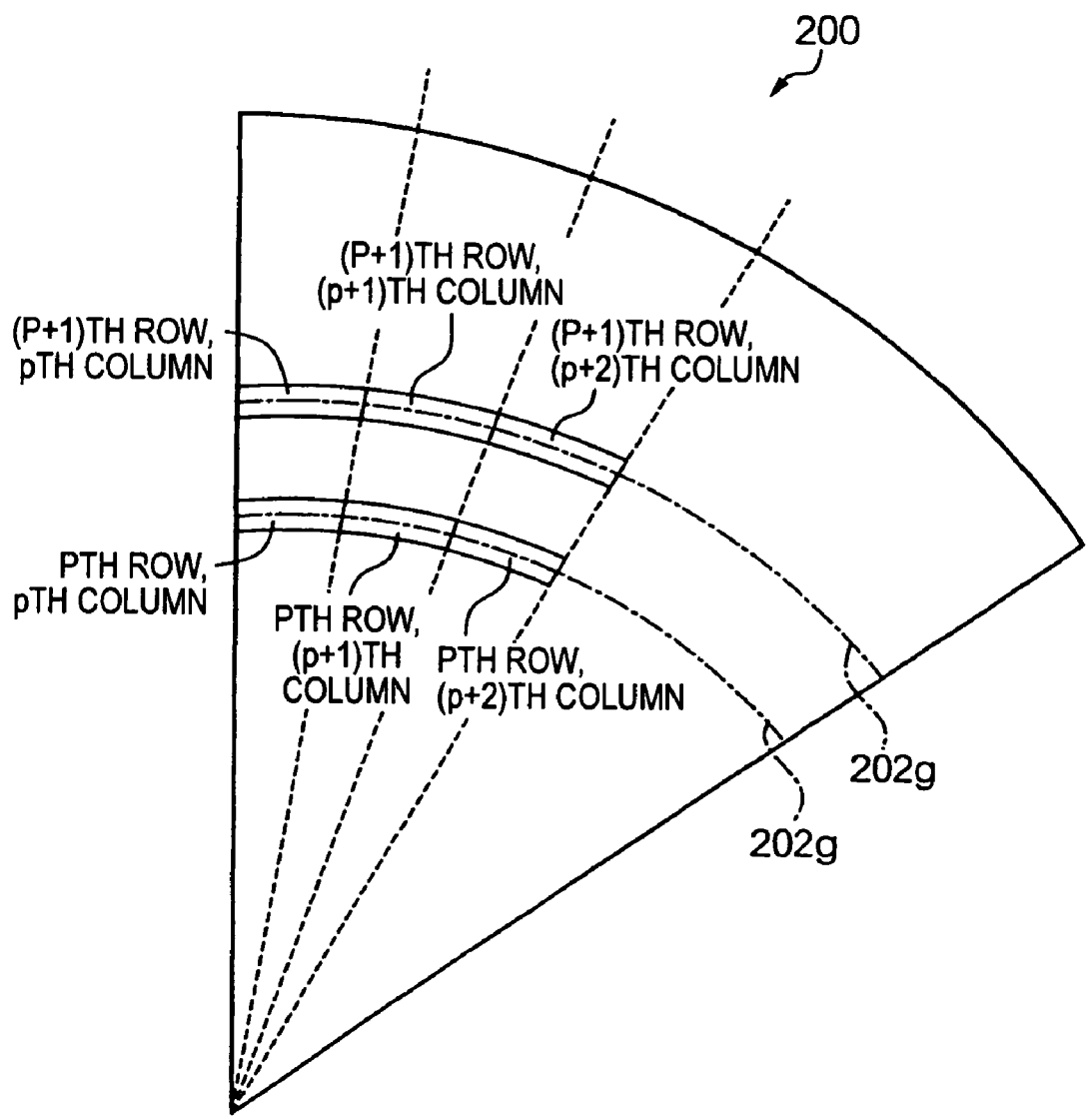
FIG. 17 is a diagram illustrating the basic operation of the optical disc recording apparatus.

In the optical disc recording apparatus of the embodiment, the specific control contents are identical with those of the embodiments described above. FIG. 17 is a diagram exemplarily showing one (the area 51) of the partition areas. In the same manner as the embodiment described above, when a coordinate system consisting of rows and columns is defined in each of the partition areas as shown in the figure, a visible image can be formed irrespective of the progress status of the data recording by performing a control in the same manner as the embodiment described above.

Modification of Third Embodiment

In the case where the resolution of a visible image to be formed is not required to be very high, the visible-image formation may be conducted by applying the laser beam without moving along the groove 202g.

In the case where the visible-image formation is conducted without moving the irradiation along the groove 202g, address information indicative of the laser beam irradiation position cannot be obtained during the visible-image formation. Therefore, it is necessary to additionally dispose a section for detecting the partition area to which the current laser beam irradiation position corresponds.

Figure 18:
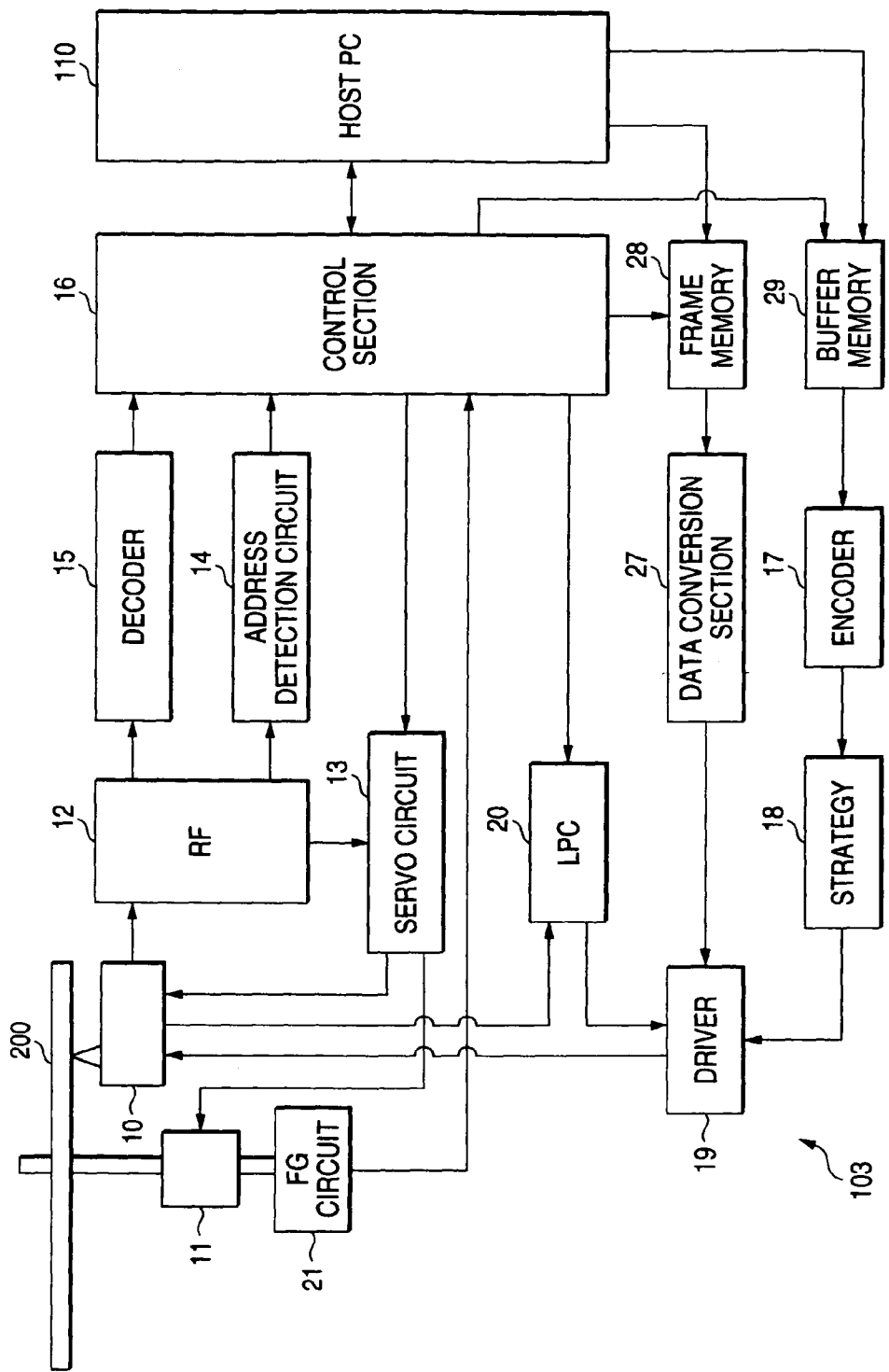
FIG. 18 is a block diagram showing the configuration of an optical disc recording apparatus 103 of a modification of the third embodiment.

FIG. 18 is a block diagram showing the configuration of an optical disc recording apparatus 103 of the modification. As shown in FIG. 18, the configuration of the optical disc recording apparatus 103 is identical with that of the embodiments described above, except that an FG circuit 21 is disposed. Therefore, description of the same components will be made with using the same reference numerals.

The FG circuit 21 outputs a signal (FG pulse signal) 21S which indicates the rotational frequency of the spindle motor 11. More specifically, while using the counter electromotive current which is obtained from a motor driver for the spindle motor 11, the circuit outputs the pulse signal 21S indicating the rotational frequency of the spindle. In the embodiment, the FG circuit 21 outputs 16 pulses of the pulse signal 21S during one rotation of the spindle motor 11.

Figure 19:
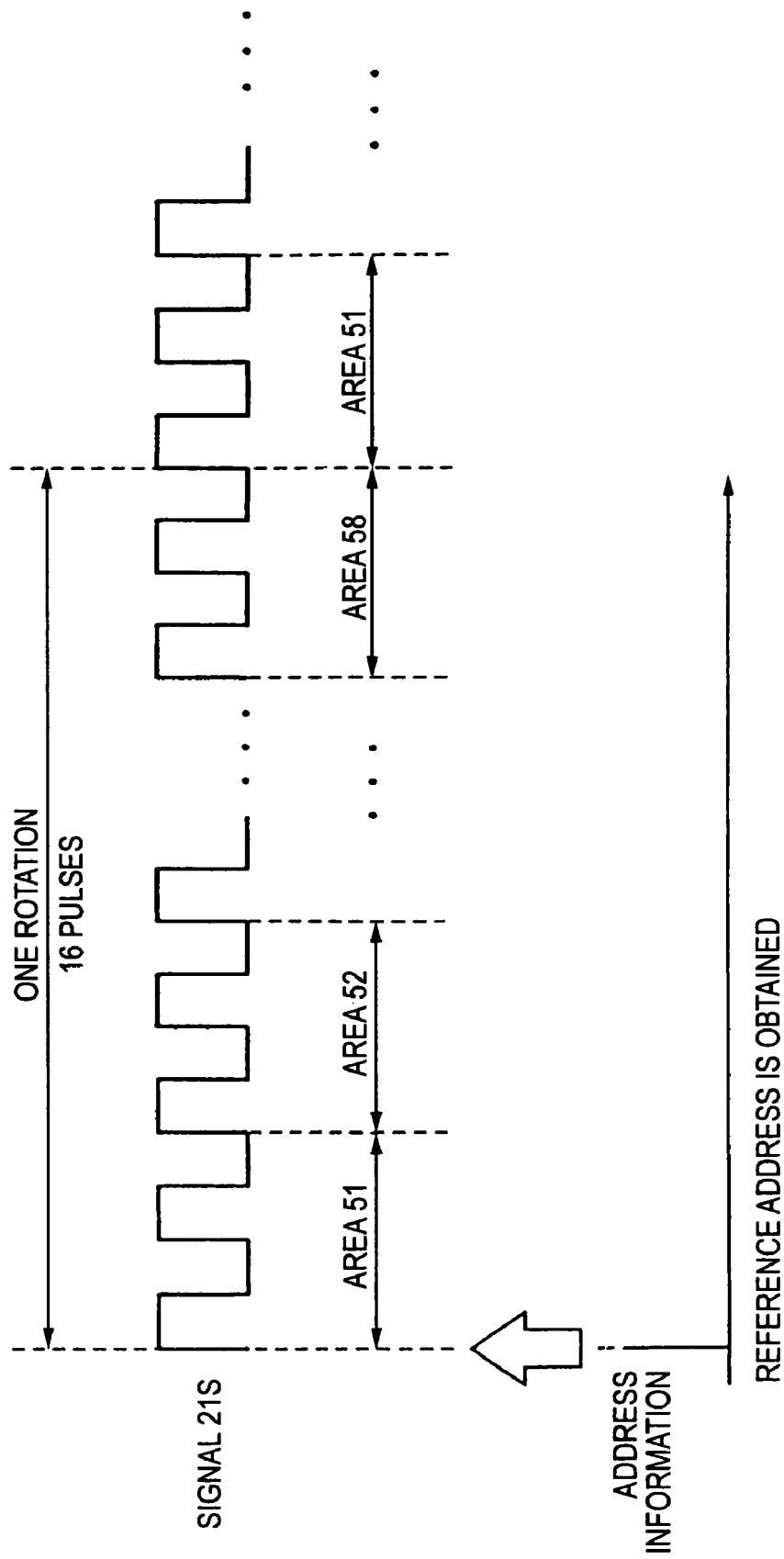
FIG. 19 is a view illustrating the basic operation of the optical disc recording apparatus 103.

FIG. 19 exemplarily shows the contents of the FG pulse signal 21S. FIG. 19 in which the abscissa is a time axis shows that the spindle motor 11, i.e., the optical disc 200 makes one rotation in a time period corresponding to 16 pulses.

In the visible-image formation, from the FG pulse signal 21S, the control section 16 detects the partition area (one of the partition areas 51 to 58) where the current laser beam irradiation position exists. This detection by the control section 16 will be specifically described with reference to FIG. 19.

As shown in FIG. 19, the FG circuit 21 outputs 16 FG pulses during one rotation of the spindle motor 11, i.e., one rotation of the optical disc 200. The control section 16 counts each of the FG pulses supplied from the FG circuit 21, thereby detecting the partition area (one of the partition areas 51 to 58) where the current laser-beam irradiation position exists.

FIG. 19 schematically shows a timing when address information is supplied from the address detection circuit 14, in addition to the FG pulse signal 21S which is supplied from the FG circuit 21 to the control section 16. At the timing when address information "0" is supplied from the address detection circuit 14, the control section 16 handles the pulses supplied from the FG circuit 21, as a reference pulse. The address information "0" is a mere example, and has a value which is preset as address information indicating the starting position of the partition area 51.

While using the reference pulse as the reference, the control section 16 detects the laser beam irradiation position. Specifically, during a period when two pulses including the reference pulse are supplied, it is detected that the laser beam is applied to the partition area 51. During a period when the next two pulses are supplied, it is detected that the laser beam is applied to the partition area 52. In this way, each time when two pulses are supplied, it is detected that the partition area onto which the laser beam is irradiated is changed.

When a sixteenth pulse counted from the reference pulse is supplied, the control section 16 detects that the laser beam is again applied to the area 51. Thereafter, while repeating the above, the control section 16 can detect (count) the pulses supplied from the FG circuit 21 to detect the partition area (one of the partition areas 51 to 58) where the laser beam irradiation position exists.

In an actual operation, preferably, the reference pulse is determined in consideration of the decoding process time in the address detection circuit 14.

In the case where the optical disc 200 on which the visible-image formation is conducted by using the optical disc recording apparatus 103 is unloaded from the apparatus 103 and then reloaded thereinto to be subjected to the visible-image formation, it is preferable to accurately perform the positioning with respect to the partition areas 51 to 58. In such a case, the control section 16 can perform the control so that the number of pulses generated during one rotation of the optical disc 200 is increased on the basis of the pulse signal supplied from the FG circuit 21. When 32 pulses are generated during one rotation of the optical disc 200, for example, a position control of higher accuracy is enabled. As means for increasing the pulse number, for example, a method in which the output signal of the FG circuit 21 is supplied to a PLL (Phase Locked Loop) circuit (not shown) may be employed.

When the method in which the reference pulse is determined so as to correspond to certain address information (for example, address "0") is employed, the control section 16 can always detect the partition area where the laser beam irradiation position exists, even in the case where the optical disc 200 is reloaded into the optical disc recording apparatus 103. Therefore, a problem in that a visible image is erroneously formed in a partition area where the image is not to be formed does not occur.

In the visible-image formation, the control section 16 detects the FG pulse signal 21S supplied from the FG circuit 21, and, at a timing when a visible image is to be formed, controls various portions of the apparatus so as to apply the laser beam to the optical disc 200, thereby forming the visible image. At this time, the control section 16 controls the laser beam irradiation position so as to be moved toward the outer peripheral side each time when the optical disc 200 makes one rotation (16 FG pulses are detected), whereby the visible-image formation can be conducted without forming a space on the disc in the same manner as the embodiment described above.

The method of determining the reference pulse is not restricted to a method in which a decode address is used, and a method in which a specific position on the optical disc 200 is marked may be employed as the determining method. Specifically, a mark may be previously formed at a specific position (for example, a position between the PMA area and the lead-in area) in the inner periphery of the disc. The reference pulse may be then determined with using the output signal of the envelope detection circuit 22 which is obtained when the specific position (specific radial position) is reproduced.

In an optical disc recording apparatus in which data is recorded while rotating the optical disc 200 at a Constant Angular Velocity (CAV), the FG circuit 21 is usually disposed, and the rotation speed of the disc is detected from the pulse signal 21S which is output from the FG circuit 21. When such an optical disc recording apparatus is used, the modification can be applied while using existing circuits as they are.

D: Modifications

The embodiments described above are mere examples illustrating the invention, and can be arbitrarily modified without departing from the spirit of the invention. Hereinafter, some modifications will be described.

(Modification 1)

In the embodiments described above, when a visible image is to be formed on the optical disc 200, data (image data) related to the visible image are supplied from an external apparatus (the host PC 110). Alternatively, the image data may be previously stored into the optical disc recording apparatus of each of the embodiments.

In the case where characters to be formed as a visible image are limited in kind, such as that where the characters are numerals and alphabetical letters, for example, image data related to the characters may be previously stored into the optical disc recording apparatus. The user can select characters to be formed as an image, by operating an operation unit (not shown) of the apparatus.

(Modification 2)

Each time when data recording is conducted, time stamp information related to the data and time of the recording may be formed as a visible image automatically or without instructions from the user. Time stamp information may be supplied as required from an external apparatus (the host PC 110) to the optical disc recording apparatus 100.

The name of the user may be previously registered, and a visible image indicating the registered user name may be automatically formed. The user can register the name by operating the host PC 110. Each time when data recording is conducted, or at a final stage of the close process of the data recording, the visible image may be automatically formed.

(Modification 3)

The optical disc 200 is provided by various manufacturers. At present, the characteristics of the recording layer 202 (the groove 202g) are varied according to the manufacture. When the heat absorptivity of the recording layer 202 is varied, it is expected that a laser beam which is to be irradiated to form the pits 202p and that which is to be irradiated to cause discoloration are varied in level.

Therefore, data recording and visible-image formation may be previously conducted on optical discs 200 of many manufacturers to obtain the optimum laser beam level for each of the discs, and the optimum levels may be stored in the memory of the control section 16. In this case, the levels may be stored with being correlated with identification information (disc ID information) indicating the kinds of the optical discs 200, so that, when the disc ID information of the optical disc 200 which is set is read, it is possible to apply a laser beam according to the kind of the disc.

As described above, according to the invention, an optical disc recording apparatus which can form a visible image at any time irrespective of the progress status of data recording can be provided. Also in an optical disc which is scheduled to be subjected to additional recording of data, for example, a visible image can be formed.

What is claimed is:

1. An optical disc recording apparatus for forming a visible image on an optical disc, the disc having a guide groove formed at a recording layer of the optical disc, the optical disc recording apparatus comprising:
    an optical pickup which applies a laser beam to the optical disc;
    a driving section which rotates the optical disc;
    a data recording section which controls the optical pickup to apply the laser beam along the guide groove formed at the recording layer of the rotated optical disc; and
    a visible image forming section which controls the optical pickup to apply the laser beam to the optical disc without moving along the groove formed at the recording layer of the rotated optical disc,
    wherein the data recording section further performs a close process of the data recording so that additional data recording on the optical disc is completely prohibited after the close process of data recording.

2. The optical disc recording apparatus according to claim 1, wherein the visible image forming section controls the optical pickup so that the laser beam applied to the optical disc has a larger spot diameter than a spot diameter at the data recording by the data recording section, whereby parts of the guide groove which are adjacently formed are discolored in a bundle to form a visible image.

3. The optical disc recording apparatus according to claim 1, wherein the visible image forming section controls the optical pickup so that the laser beam is irradiated by wobbling in a range extending over parts of the guide groove which are adjacently formed.

4. An optical disc recording apparatus for forming a visible image on an optical disc, the disc having a guide groove formed at a recording layer of the optical disc, the optical disc recording apparatus comprising:
    an optical pickup which applies a laser beam to the optical disc;
    a driving section which rotates the optical disc; and
    a visible image forming section which controls the optical pickup to apply the laser beam to the optical disc without moving along the groove formed at a recording layer of the rotated optical disc, wherein the visible image forming section controls the optical pickup so that the laser beam is irradiated by wobbling in a range extending over parts of the guide groove which are adjacently formed.

* * * * *